United States Patent
Hwang et al.

(10) Patent No.: US 9,277,467 B2
(45) Date of Patent: Mar. 1, 2016

(54) COMMUNICATION SYSTEM WITH ADAPTIVE HANDOVER CONTROLLER AND METHOD OF OPERATION THEREOF

(75) Inventors: Insoo Hwang, San Diego, CA (US); Jungwon Lee, San Diego, CA (US); Heejin Roh, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1118 days.

(21) Appl. No.: 13/315,275

(22) Filed: Dec. 8, 2011

(65) Prior Publication Data

US 2013/0150053 A1    Jun. 13, 2013

(51) Int. Cl.
*H04W 36/00* (2009.01)
(52) U.S. Cl.
CPC ................................ *H04W 36/0083* (2013.01)
(58) Field of Classification Search
CPC . H04W 36/0083; H04W 36/32; H04W 56/00; H04W 16/26; H04W 28/04
USPC ......... 455/436, 437, 438, 439, 440, 441, 442, 455/443, 444
See application file for complete search history.

(56) References Cited

U.S. PATENT DOCUMENTS

| | | | |
|---|---|---|---|
| 5,267,261 A | 11/1993 | Blakeney, II et al. | |
| 7,197,310 B2 | 3/2007 | Gehlot et al. | |
| 7,389,111 B2 | 6/2008 | Petrus | |
| 2007/0081584 A1* | 4/2007 | Alessandro | 375/232 |
| 2010/0029274 A1* | 2/2010 | Deshpande et al. | 455/435.3 |
| 2010/0087195 A1* | 4/2010 | Lu et al. | 455/436 |

OTHER PUBLICATIONS

Danish Aziz and Rolf Sigle, Improvement of LTE Handover Performance through Interference Coordination, Alcatel-Lucent Bell Labs, Stuggart, Germany; http://202.194.20.8/proc/VTC09Spring/DATA/09-02-03.PDF.
Sarddar et al., A RSS Based Adaptive Hand-Off Management Scheme In Heterogeneous Networks, IJCSI International Journal of Computer Science Issues, vol. 7, Issue 6, Nov. 2010, India; http://www.ijcsi.org/papers/7-6-232-238.pdf.

* cited by examiner

*Primary Examiner* — Christopher M Brandt
*Assistant Examiner* — Edd Rianne Plata
(74) *Attorney, Agent, or Firm* — IP Investment Law Group

(57) ABSTRACT

A method of operation of a communication system includes: estimating a channel; calculating a predicted signal within the channel; evaluating a prediction accuracy of the predicted signal; and adjusting a handoff parameter when the prediction accuracy of the predicted signal is within a threshold range for communicating through a mobile station.

28 Claims, 7 Drawing Sheets

COMMUNICATION SYSTEM WITH ADAPTIVE HANDOVER CONTROLLER AND METHOD OF OPERATION THEREOF

TECHNICAL FIELD

The present invention relates generally to a communication system, and more particularly to a system for controlling adaptive handover.

BACKGROUND ART

Modern portable consumer and industrial electronics, such as navigation systems, cellular phones, portable digital assistants, and combination devices, are providing increasing levels of functionality to support modern life including mobile communication. As users become more empowered with the growth of mobile communication technology, new and old paradigms begin to take advantage of this new device space.

The ever increasing need for information in modern life requires users to have access to information at all times, even while moving. However, signals used in mobile communication effectively have finite transmission ranges. As a user travels, communication channels can be chosen using a handover or handoff process to account for the limited signal range and utilize a signal having high power from a base station or between multiple base stations. The failure to successfully change channels result in increased number of dropped calls and also places unnecessary strain on the resources.

However, the increased burden on the communication networks, the advances in transportation methods and the rapidly changing landscapes are all contributing to increase in handover failures. Further, the increase in demand and access speed of the information has already placed a strain on the network resources, requiring efficiency in managing such resources.

Thus, a need still remains for a communication system with adaptive handover controller. In view of the increasing consumer needs, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: estimating a channel; calculating a predicted signal within the channel; evaluating a prediction accuracy of the predicted signal; and adjusting a handoff parameter when the prediction accuracy of the predicted signal is within a threshold range for communicating through a mobile station.

The present invention provides a communication system, including: a channel-estimation module for estimating a channel; a prediction module, coupled to the channel-estimation module, for calculating a predicted signal within the channel; an evaluation module, coupled to the prediction module, for evaluating the prediction accuracy of the predicted signal; and an adaption module for adjusting a handoff parameter when the prediction accuracy of the predicted signal is within a threshold range for communicating through a mobile station.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
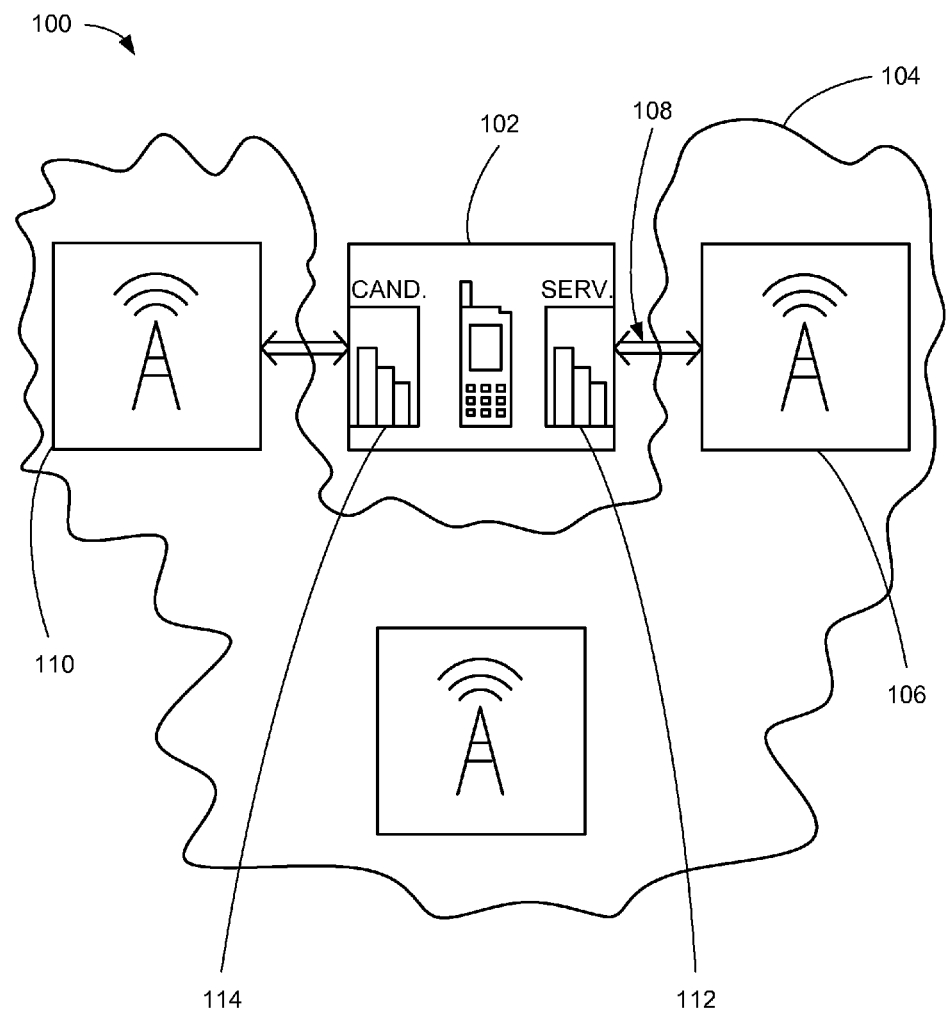
FIG. 1 is a communication system with adaptive handover controller mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures to peripheral storage devices, manipulating data structures, and reading data structures from external sources. Data structures are defined to be files, input data, system generated data, such as calculated data, and program data.

The term "reference-signal-received-power" (RSRP) is defined as the power level of the reference signal portion within the received signal. For example, the base station or the mobile unit can measure the power in the portions of the received signal designated as the reference signal portion. The RSRP can be used to describe the quality of the signal, such as the strength or clarity of the signal.

Referring now to FIG. 1, therein is shown a communication system 100 with adaptive handover controller mechanism in an embodiment of the present invention. The communication system 100 includes a mobile station 102, such as a cellular phone or a notebook computer, connected to a network 104. The network 104 is defined as a system of wires or wireless communications devices that are connected to each other for enabling communication between devices.

For example, the network 104 can be a set of connections between wireless cellular phone network having base stations, communication towers and antennae, servers, or client devices. Also, for example, the network 104 can be set of connections between system of wireless routers, Ethernet cables, computers, and servers.

The network 104 can include a set of base stations that is used to receive, transmit, relay, process or combination thereof, for wireless signals. The base stations can facilitate the communication with the mobile station 102 by sending, receiving, and relaying communication signals to and from the mobile station 102. The mobile station 102 can be connected to the network 104 through a serving station 106.

The serving station 106 is defined as a base station that has established a communications link with the mobile station 102 and that is being used to communicate with the mobile station 102. For example, the serving station 106 can be the cell tower, the base station, the wireless router, the antenna, or a combination thereof being used to send signals to or receive signals from the mobile station 102, such as a laptop computer or a cellular phone.

The mobile station 102 can communicate with the serving station 106 through a channel 108. The channel 108 is defined as a medium used for conveying information signal. The mobile station 102 can access the network 104 through the channel 108. For example, the channel can encompass frequency, time slot, packet designation, channel code, or combination thereof used for transmission of signals. Also, for example, the channel can include the behavior of the medium, such as reflection and loss caused by wires or refractions and obstructions in wireless environment.

The mobile station 102 can look for a candidate station 110 to maintain connection to the network 104 while moving. The candidate station 110 is defined as a base station that can be used to facilitate the communication with the mobile station 102 but is not serving such function. For example, the candidate station 110 can be one or all of the cell sites adjacent to the serving station 106. Also, for example, the candidate station 110 can be the wireless router or another client device capable of rebroadcasting or transmitting that is closest to the mobile station 102 or within a threshold distance.

The serving station 106 can be used to transmit the communication signals, such as voice signals of a telephone call or a webpage. The candidate station 110 can also communicate with the mobile station 102 by sending reference signals or by broadcasting previously determined training signals. The mobile station 102 can receive and process such signals from the candidate station 110.

Based on the communication method, such as code division multiple access (CDMA) or Third Generation Partnership Project (3GPP) Long Term Evolution (LTE), the communication signals can also have reference signals imbedded in the communicated information. The reference signals can exist as a predetermined bit, pulse, wave, or a combination thereof. The reference signals can be embedded within the communicated information at a regular time interval, frequency, code, or a combination thereof.

The mobile station 102 can detect and measure the power level of the reference signals from various sources. The mobile station 102 can detect and calculate a base reference-signal-received-power 112 and a candidate reference-signal-received-power 114. The base reference-signal-received-power 112 is defined as the measured power of the reference signal originating from the serving station 106. The candidate reference-signal-received-power 114 is defined as the measured power of the reference signal originating from the candidate station 110.

Based on certain conditions, the mobile station 102 can break the link to the serving station 106 and establish a new link to one of the candidate stations. The candidate station 110 with the newly established link can become the serving station 106. The previous serving station can become one of the candidate stations or a different base station within the network 104 after the transition. The details regarding the transition will be discussed below.

Figure 2:
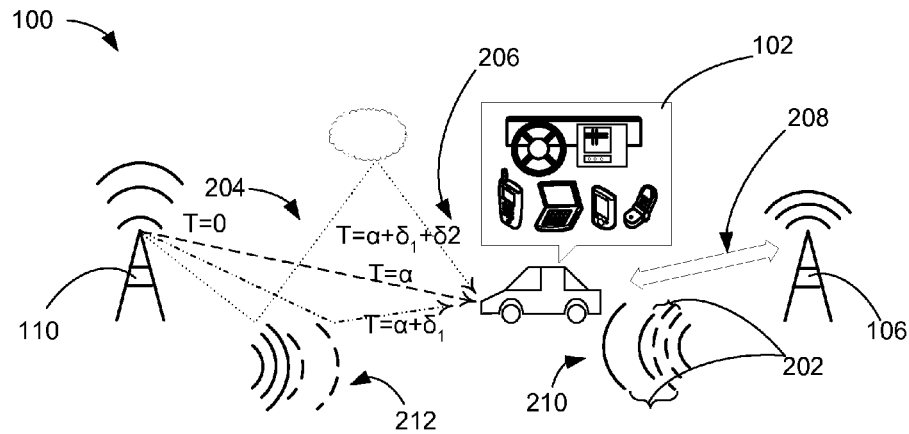
FIG. 2 is an illustration of signal behavior within the communication system.

Referring now to FIG. 2, therein is shown an illustration of signal behavior within the communication system 100. Signals transmitted from the serving station 106 can experience a shift in frequency due to the Doppler Effect and gain a Doppler frequency 202. The Doppler frequency 202 is defined as the amount of change in the frequency of a signal due to the movement of the mobile station 102.

Signals transmitted through the channel 108 of FIG. 1 can experience a multipath interference 204. The multipath interference 204 is defined as degradation or alteration of the transmitted signal due to the signal overlapping with the time-delayed or phase-shifted variant of the same signal. Reflection and refraction can cause a delay in time or a change in frequency or phase, which can cause the multipath interference 204.

For example, a particular signal $\Omega_1$ can arrive at the mobile station 102 at time $\alpha$ by following a direct line-of-sight. The same signal can reflect off of the ground and arrive at time $\alpha+\delta_1$. The signal can experience a delay due to the increase in distance travelled caused by reflections. The same signal can experience multiple reflections and experience even a longer delay, such as when the same signal reflects off of the ground and the cloud and arrive at time $\alpha+\delta_1+\delta_2$.

Continuing with the example, the delayed signals can interfere with other signals arriving at the same time. A signal $\Omega_2$, subsequent to $\Omega_1$ and following a direct line-of-sight, can arrive at $\alpha+\delta_1$. The signal $\Omega_2$ would experience interference, such as a change in amplitude, phase, frequency, or a combination thereof, due to the delayed $\Omega_1$ arriving at the same time. A signal $\Omega_3$, subsequent to $\Omega_2$ and following a direct line-of-sight, can arrive at $\alpha+\delta_1+\delta_2$. The signal can experience interferences from both $\Omega_1$ and $\Omega_2$.

Signals can experience the multipath interference 204 due to various sources. For example, the earth terrain, the atmosphere, buildings, or the temperature of the medium can all cause the multipath interference 204.

The multipath interference 204 can have a delay spread 206. The delay spread 206 is defined as the longest delay time for a signal caused by the multipath interference 204. Continuing with the example above, the delay spread 206 can be $\delta_1+\delta_2$ if no other delayed signals arrive after such time. The delay spread 206 can be expressed in time, frequency, or phase shift.

The serving station 106 and the mobile station 102 can have a communication link 208. The communication link 208 is defined as the relationship or connection between the mobile station 102 and the serving station 106. The communication link 208 can be the connection for facilitating the communication between the mobile station 102 and a destination.

For example, the mobile station 102 can be used for a telephone call to another phone and the data for the phone call can go through the serving station 106 via the communication link 208. The data can be exchanged exclusively through the communication link 208. The mobile station 102 can send the information or receive the information to a different or new serving station after establishing the communication link 208.

The mobile station 102 and the serving station 106 can establish the communication link 208 to enable communication with the mobile station 102 through the serving station 106. The communication link 208 can be established through following a predetermined protocol. The protocol for establishing the communication link 208 can be predetermined by the user, the communication system 100, the software or hardware manufacturer, standard setting entities, such as the Institute of Electrical and Electronics Engineers or the International Telecommunication Union, or a combination thereof.

When the mobile station 102 is in transit, the Doppler frequency 202 can result in both a base shift 210 and a candidate shift 212. The base shift 210 is defined as the Doppler frequency 202 occurring in signals exchanged between the mobile station 102 and the serving station 106. The candidate shift 212 is defined as the Doppler frequency 202 occurring in signals exchanged between the mobile station 102 and the candidate station 110.

Figure 3:
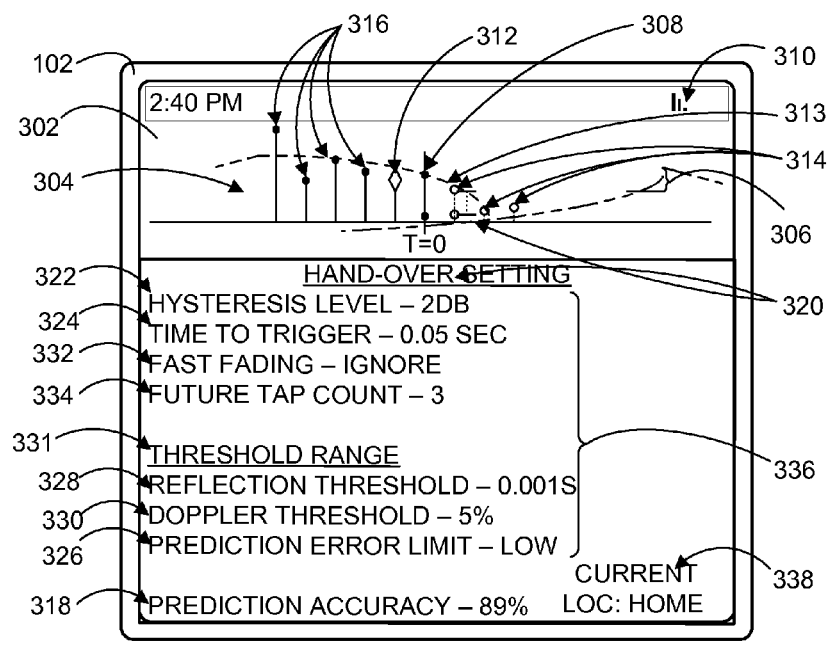
FIG. 3 is an example of a display interface of the mobile station.

Referring now to FIG. 3, therein is shown an example of a display interface 302 of the mobile station 102. The display interface 302 can show a channel model 304 for diagnostic purposes. The channel model 304 is defined as a characterization of signal behavior in a specific channel. The channel model 304 can be a description or a prediction of the various effects, such as losses and interferences, a signal would experience within a channel at a particular location or within channels typical of certain types of locations. The channel model 304 can be one or a set of equations or a set of predetermined parameters describing the behavior of the signals.

For example, the channel model 304 can be Saleh, Rayleigh, or Ricean model. Also, for example, the channel model 304 can follow standards set for 3GPP LTE and be Extended Pedestrian A (EPA), Extended Vehicular A (EVA), Extended Typical Urban (ETU), or a combination thereof.

The channel model 304 can account for a path-loss 306. The path-loss 306 is defined as the degradation in the signal while propagating through a medium and away from the source. The path-loss 306 can be the attenuation in the intensity of the signal, such as in power or amplitude, a change in the shape or phase of the signal, or a combination thereof. For example, a transmitted signal can lose strength due to loss caused by effects such as free-space loss or diffraction, and have less intensity when received.

The path-loss 306 can be a function of distance. The path-loss 306 can increase, and the intensity of the received signal will decrease as a result, as the distance between the transmitter and the receiver increases. The path-loss 306 can occur over long distances, such as in the order of 100 to 1000 meters. For example, the mobile station 102 will receive weaker signal as it travels further away from the serving station 106 of FIG. 1.

The channel model 304 can also account for the multipath interference 204 of FIG. 2. The multipath interference 204 can occur over shorter distances than the path-loss 306, such as in the order of 10 to 100 meters. The channel model 304 can account for the path-loss 306, the multipath interference 204, or a combination thereof.

The display interface 302 can also show a current signal 308, a current reference-signal-received-power 310, a designated tap 312, a predicted signal 313, a predicted tap 314, and a previously measured power 316. For illustrative purposes, the current signal 308, the designated tap 312, the predicted signal 313, the predicted tap 314 and the previously measured power 316 will be discussed in reference to signals received at the mobile station 102. However, it is understood that the above elements can be in reference to the signal received at the serving station 106 or at the candidate station 110 of FIG. 1.

The communication system 100 of FIG. 1 can receive the current signal 308 having the current reference-signal-received-power 310. The current signal 308 is defined as the communication signal currently being received by the mobile station 102. The current signal 308 can have reference signals embedded therein. The current reference-signal-received-power 310 is defined as the power measurement of the reference signal portion within the current signal. The communication system 100 can log and record the current signal 308 and the corresponding reception time for further processing.

The designated tap 312 is the recorded value of the current signal 308 or the current reference-signal-received-power 310 a particular point in time. For example, the designated tap 312 can be the signal currently being received at the mobile station 102. Also, for example, the designated tap 312 can be a signal received at a specified moment in time, such as the 'k'th tap or at time 't.'

The predicted signal 313 is defined as a calculated prediction of the signal likely to be received at a time later than that of the current signal 308. For example, the predicted signal 313 can be the calculated pattern of data and reference signals or the total power of the overall signal. Also, for example, the predicted signal 313 can be calculated using the correlation of the signals received.

The predicted tap 314 is defined as a calculated value of a signal likely to be received at a time later than that of the current signal 308 or the designated tap 312. For example, the predicted tap 314 can be the calculated value of the RSRP of the signal that will be received four sampling periods later or 0.1 second in the future. Also, for example, the predicted tap 314 can be the calculation of the amplitude of the signal that will be received by the mobile station 102 at 'n' milliseconds or taps after the reference time or tap 'k.' The predicted tap 314 can be denoted as p[k+n].

For illustrative purposes, the communication system 100 will be discussed as using the RSRP of the current and past signals, and calculated predicted signals to initiate and process various function. However, it is understood that the communication system 100 can function differently. For example, the communication system 100 can use the amplitude or the phase shift of the various signals.

The communication system 100 can calculate the predicted tap 314 based on models or recorded behaviors. Details regarding the calculations for the predicted tap 314 will be discussed below.

The previously measured power 316 is defined as the measurement of the signal received at a time before the time of the current signal 308 or the designated tap 312. For example, the previously measured power 316 can be the measured value of the RSRP of the signal that was received 2 sampling periods or 5 milliseconds ago. Also, for example, the previously measured power 316 can be the measured amplitude or phase shift of the signal that was received by the mobile station 102 at 'm' milliseconds or taps before the reference time 'k.' The previously measured power 316 can be denoted as s[k−m].

The communication system 100 can log the various values of the predicted tap 314 and the current signal 308 at various times or continuously at regular intervals. For example, the communication system 100 can receive the current signal 308 at t=0 and calculate the predicted tap 314 three taps later at t=3 and record both values.

Continuing with the example, the communication system 100 can repeat the process for three taps for t=1, 2, and 3, and record all values. At t=3, the communication system 100 can have the recorded values for the current signal 308 at t=0, 1 . . . 3, and the recorded values for the predicted tap 314 at t=3, 4 . . . 6. At t=3, the recorded values for the current signal 308 for t=0, 1, and 2 can be different instances of the previously measured power 316 and s[3] can be the designated tap 312.

In storing the various values of the predicted tap 314 and the previously measured power 316, the communication system 100 can compare the stored predictions to the current reference-signal-received-power 310, the designated tap 312, the previously measured power 316, or a combination thereof. Based on the comparison, the communication system 100 can compute a prediction accuracy 318.

The prediction accuracy 318 is defined as the difference between a previously calculated value of the predicted tap 314 and the designated tap 312 or the previously measured power 316. The prediction accuracy 318 can be represented as a percentage based on the designated tap 312 or as a magnitude. The prediction accuracy 318 is dependent upon the correlation level between RSRP taps, such as the designated tap 312, the predicted tap 314, or the previously measured power 316.

Continuing with the example above, the communication system 100 can calculate the prediction accuracy 318 at t=3 between the current reference-signal-received-power 310, s[3], and the predicted tap 314, p[3], by subtracting one from the other. The prediction accuracy 318 can be represented as a percentage of the current reference-signal-received-power 310 or as magnitude of the difference in decibels. Details regarding the calculations and error computation will be discussed below.

The display interface 302 can also show conditions for controlling a handover 320. The handover 320 is defined as the event where the means or data exchange from one channel to another. The handover 320 can be the change in the channel 108 of FIG. 1, such as frequency, time slot, code, or combination thereof between the mobile station 102 and the serving station 106.

The handover 320 can also include establishing a connection between the mobile station 102 and the serving station 106. The mobile station 102 and one of the base stations can establish the serving station 106 upon initialization of the mobile station 102 based on certain criteria. The mobile station 102 can also establish the communication link 208 of FIG. 2 with the candidate station 110 when the signal quality exchanged with the candidate station 110 is found to be better and stronger than the signal between the serving station 106.

The mobile station 102 and the serving station 106 can break the communication link 208 there-between and establish the communication link 208 anew with one of the candidate station 110. The newly connected base station can then serve as the serving station 106. Thusly, the mobile station 102 can continue the communication through a different base station through the handover 320. The conditions for initiating the handover 320 and varying such conditions will be discussed in detail below.

The conditions for controlling the handover 320 can include a hysteresis level 322, a time-to-trigger 324, a prediction error limit 326, a reflection threshold 328, and a Doppler threshold 330. The hysteresis level 322 is defined as a threshold level in the power measurements of signals received in difference channels for controlling the handover 320. The hysteresis level 322 can be the threshold level for comparing against the difference between the base reference-signal-received-power 112 of FIG. 1 and the candidate reference-signal-received-power 114 of FIG. 1 to initiate the handover 320.

For example, the hysteresis level 322 can be determined by a percentage value, such as 10% greater than the base reference-signal-received-power 112. The communication system 100 can initiate the handover 320 when the candidate reference-signal-received-power 114 is 110% of the base reference-signal-received-power 112 or greater.

Also, for example, the hysteresis level can be a finite level, such as 5 dB. The communication system 100 can initiate the handover 320 when the candidate reference-signal-received-power 114 is 5 dB greater than the base reference-signal-received-power 112.

The hysteresis level 322 can be based on the base reference-signal-received-power 112 alone. For example, the hysteresis level 322 can be set to a predetermined level of power for the base reference-signal-received-power 112, such that the communication system 100 initiates the handover 320 when the base reference-signal-received-power 112 falls below the hysteresis level 322.

The time-to-trigger 324 is defined as the threshold duration where the power conditions regarding the hysteresis level 322 must be satisfied for initiating the handover 320. The time-to-trigger 324 can require the base reference-signal-received-power 112, the candidate reference-signal-received-power 114, or a combination thereof to satisfy the hysteresis level 322 for the specified time duration for the communication system 100 to initiate the handover 320. The time-to-trigger 324 can be used to disregard erroneous or anomalous readings or calculation results and ensure power conditions for initiating the handover 320 are correct.

For example, if the time-to-trigger 324 is 50 milliseconds, the communication system 100 can be set to initiate the handover 320 only when the candidate reference-signal-received-power 114 is greater than the base reference-signal-received-power 112 by at least the hysteresis level 322 for at least 50 milliseconds. Also, for example, if the TTT is set to 10 sampling periods, the base reference-signal-received-power 112 must be below the hysteresis level 322 for at least 10 sampling periods.

The prediction error limit 326 is defined as the threshold value for determining when the channel prediction is accurate enough to adjust the necessary conditions for initiating the handover 320. The communication system 100 can adjust the parameters for initiating the handover 320 when the prediction accuracy 318 is below the prediction error limit 326. For example, the communication system 100 can decrease or increase the hysteresis level 322, the time-to-trigger 324, or a combination thereof when the computed error between the calculated prediction and the actual RSRP is below the prediction error limit 326.

The prediction error limit 326 can be expressed by predetermined levels, such as low or high, percentage, a magnitude, or a combination thereof for 1 sample or for a number of samples or duration. For example, the low level can require the predicted values of the RSRP to be within 10% of the actual values of the RSRP for at least 10 consecutive taps or 20 milliseconds. Also, for example, the high level can require the predicted values to be within 5 dB.

The reflection threshold 328 is defined as the threshold value for determining when to adjust the parameters for initiating the handover 320 based on the delay spread 206 of FIG. 2. The communication system 100 can adjust the parameters for initiating the handover 320 when the delay spread 206 is greater than the reflection threshold 328. For example, the communication system 100 can decrease or increase the hysteresis level 322, the time-to-trigger 324, other parameters, or a combination thereof when the delay spread 206 is greater than the reflection threshold 328.

The Doppler threshold 330 is defined as the threshold value for determining when to adjust the parameters for initiating the handover 320 based on the Doppler frequency 202 of FIG. 2. The communication system 100 can adjust the parameters for initiating the handover 320 when the base shift 210 of FIG. 2, the candidate shift 212 of FIG. 2, or both are greater than the Doppler threshold 330.

The display interface 302 can show a threshold range 331. The threshold range 331 is defined as a range, value, or a combination thereof for comparing with attributes of the current signal 308. The threshold range 331 can be the threshold values or ranges for deciding whether to adjust the hysteresis level 322, the time-to-trigger 324, other parameters, or a combination thereof. For example, the threshold range 331 can include the prediction error limit 326, the reflection threshold 328, the Doppler threshold 330, or a combination thereof.

The display interface 302 can also show controls for dealing with a fast-fade 332 and settings for a future tap count 334. The fast-fade 332 is defined as signal variation that is considered too rapid for the communication system 100 to follow. The fast-fade 332 can be variations in the signal amplitude that changes rapidly with time. The fast-fade 332 can be due to the coherence time of the channel 108 being less than the delay constraint of the channel 108. The variation due to fast fading can occur over distances in the order of the signal wavelength.

The display interface 302 can show handoff parameters 336, such as the hysteresis level 322, the time-to-trigger 324, the prediction error limit 326, the reflection threshold 328, the Doppler threshold 330, and controls for the fast-fade 332 and the future tap count 334. The communication system 100 can adjust the levels or settings of one, multiple, or all of the handoff parameters 336.

For example, the communication system 100 can decrease the time-to-trigger 324, the hysteresis level 322, or both to speed up the handover 320. The communication system 100 can also increase the future tap count 334 or the Doppler threshold 330 to decrease false or premature occurrences of the handover 320.

It has been discovered that the present invention provides the communication system 100 for quantifying previous channel history and its correlation value. The combination of the current reference-signal-received-power 310, the base reference-signal-received-power 112, the candidate reference-signal-received-power 114, the predicted tap 314, the previously measured power 316, the prediction accuracy 318 give rise to the quantifying of previous channel history and its correlation value by logging the actual and calculated future RSRP values and their relationships and performances. The quantified history and correlation value can be used to further improve the timing and locations for the handover 320.

The display interface 302 can show a location information 338. The location information 338 is defined as the representation of the location, movement, or both of the mobile station 102. The location information 338 can be coordinate or map based notation. For example, the location information 338 can be a longitude-latitude coordinates set, street address, bisecting streets, global positioning system (GPS) coordinates, or a combination thereof.

The location information 338 can also be a relative value. For example, the location information 338 can be "home", "preferred restaurant", two blocks north of a known location, or a combination thereof. The location information 338 can be related by the user, the software or hardware manufacturer, the communication system 100 or a combination thereof.

The location information 338 can also represent movement of the mobile station 102. The location information 338 can include acceleration, direction, velocity, or a combination thereof.

Figure 4:
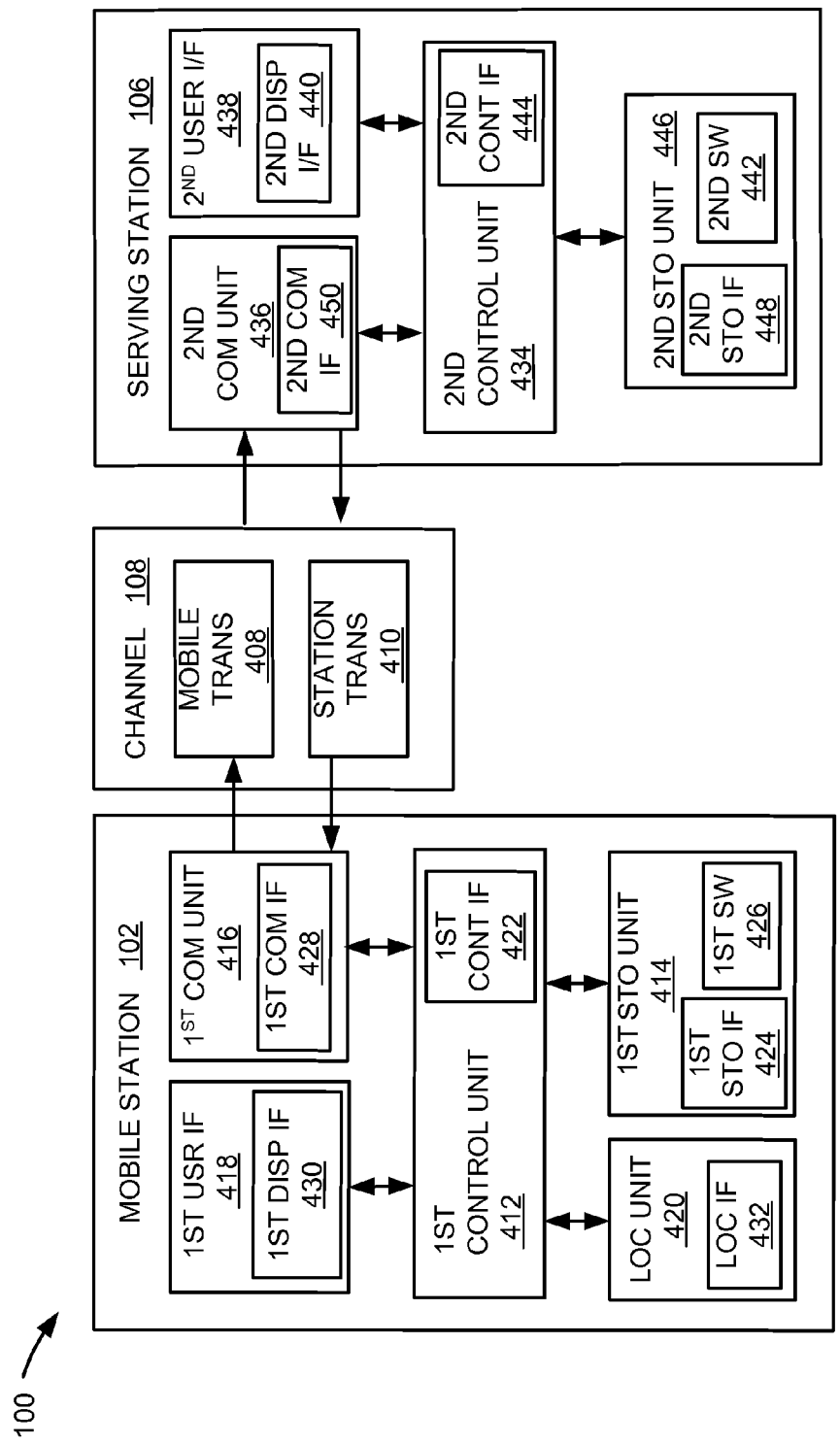
FIG. 4 is an exemplary block diagram of the communication system.

Referring now to FIG. 4, therein is shown an exemplary block diagram of the communication system 100. The communication system 100 can include the mobile station 102, the channel 108, and the serving station 106.

The mobile station 102 can communicate with anything within the network 104, such as the serving station 106 or the candidate station 110, over the channel 108. The screen shot shown on the display interface 302 described in FIG. 2 can represent the screen shot for the communication system 100.

For illustrative purposes, the communication system 100 will be described as having the mobile station 102 interacting with the serving station 106 through the channel 108. It is understood that the mobile station 102 can communicate with other base stations in the network 104 of FIG. 1, such as the candidate station 110 of FIG. 1, and with other components in the network 104 through the base stations.

For example, the mobile station 102 can communicate with multiple base stations to decide handover, and having a plurality of the candidate station 110. Also, for example, the mobile station 102 can communicate with cellular phones in other areas through the serving station 106 and the network 104.

The mobile station 102 can send information in a mobile transmission 408 over the channel 108 to the serving station 106. The serving station 106 can send information in a station transmission 410 over the channel 108 to the mobile station 102.

For illustrative purposes, the communication system 100 is shown with the mobile station 102 as a client device, although it is understood that the communication system 100 can have the mobile station 102 as a different type of device. For example, the mobile station 102 can be a server.

Also for illustrative purposes, the communication system 100 is shown with the serving station 106 as a server and a communications tower and base station, although it is understood that the communication system 100 can have the serving station 106 as a different type of device. For example, the serving station 106 can be a client device.

For brevity of description in this embodiment of the present invention, the mobile station 102 will be described as a client device and the serving station 106 will be described as communication base station having a communications tower. The present invention is not limited to this selection for the type of devices. The selection is an example of the present invention.

The mobile station 102 can include a first control unit 412, a first storage unit 414, a first communication unit 416, a first user interface 418, and a location unit 420. The mobile station 102 can be similarly described by the mobile station 102. The first control unit 412 can include a first control interface 422. The first storage unit 414 can include a first storage interface 424.

The first control unit 412 can execute a first software 426 to provide the intelligence of the communication system 100. The first control unit 412 can operate the first user interface 418 to display information generated by the communication system 100. The first control unit 412 can also execute the first software 426 for the other functions of the communication system 100, including receiving location information from the location unit 420. The first control unit 412 can further execute the first software 426 for interaction with the channel 108 of FIG. 1 via the first communication unit 416.

The first control unit 412 can be implemented in a number of different manners. For example, the first control unit 412 can be a processor, an embedded processor, a microprocessor, a hardware control logic, a hardware finite state machine, a digital signal processor, or a combination thereof.

The first control unit 412 can include the first control interface 422. The first control interface 422 can be used for communication between the first control unit 412 and other functional units in the mobile station 102. The first control interface 422 can also be used for communication that is external to the mobile station 102.

The first control interface 422 can receive information from the other functional units or from external sources, or can transmit information to the other functional units or to external destinations. The external sources and the external destinations refer to sources and destinations external to the mobile station 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system, optical circuitry, waveguides, wireless circuitry, wireline circuitry, or a combination thereof.

The first storage unit 414 can store the first software 426. The first storage unit 414 can also store the relevant information, such as advertisements, points of interest, navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory, Flash memory, disk storage, or a volatile storage such as static random access memory.

The first storage unit 414 can include the first storage interface 424. The first storage interface 424 can be used for communication between the location unit 420 and other functional units in the mobile station 102. The first storage interface 424 can also be used for communication that is external to the mobile station 102.

The first storage interface 424 can receive information from the other functional units or from external sources, or can transmit information to the other functional units or to external destinations. The external sources and the external destinations refer to sources and destinations external to the mobile station 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the mobile station 102. For example, the first communication unit 416 can permit the mobile station 102 to communicate with the serving station 106 of FIG. 1, an attachment, such as a peripheral device or a computer desktop, and the channel 108.

The first communication unit 416 can also function as a communication hub allowing the mobile station 102 to function as part of the channel 108 and not limited to be an end point or terminal unit to the channel 108. The first communication unit 416 can include active and passive components, such as microelectronics or an antenna, for interaction with the channel 108.

The first communication unit 416 can include a first communication interface 428. The first communication interface 428 can be used for communication between the first communication unit 416 and other functional units in the mobile station 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user to interface and interact with the mobile station 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. Examples of the output device of the first user interface 418 can include the first display interface 430. The first display interface 430 can include a display, a projector, a video screen, a speaker, or any combination thereof.

The location unit 420 can generate location information, current heading, current acceleration, and current speed of the mobile station 102, as examples. The location unit 420 can be implemented in many ways. For example, the location unit 420 can function as at least a part of GPS, an inertial navigation system, a cellular-tower location system, a pressure location system, or any combination thereof. Also, for example, the location unit 420 can utilize components such as an accelerometer or GPS receiver.

The location unit 420 can include a location interface 432. The location interface 432 can be used for communication between the location unit 420 and other functional units in the mobile station 102. The location interface 432 can also be used for communication that is external to the mobile station 102.

The location interface 432 can receive information from the other functional units or from external sources, or can transmit information to the other functional units or to external destinations. The external sources and the external destinations refer to sources and destinations external to the mobile station 102.

The location interface 432 can include different implementations depending on which functional units or external units are being interfaced with the location unit 420. The location interface 432 can be implemented with technologies and techniques similar to the implementation of the first control unit 412.

For illustrative purposes, the mobile station 102 is shown with the partition having the first control unit 412, the first storage unit 414, the first user interface 418, the first communication unit 416, and the location unit 420 although it is understood that the communication system 100 can have a different partition. For example, the first software 426 can be partitioned differently such that some or all of its function can be in the first control unit 412, the location unit 420, and the first communication unit 416. Also, the mobile station 102 can include other functional units not shown in FIG. 4 for clarity.

The functional units in the mobile station 102 can work individually and independently of the other functional units. The mobile station 102 can work individually and independently from the serving station 106 and the channel 108.

The serving station 106 can be optimized for implementing the present invention in a multiple device embodiment with the mobile station 102. The serving station 106 can provide the additional or higher performance processing power compared to the mobile station 102. The serving station 106 can include a second control unit 434, a second communication unit 436, and a second user interface 438.

The second user interface 438 allows a user to interface and interact with the serving station 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the serving station 106 of the communication system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the communication system 100, including operating the second communication unit 436 to communicate with the mobile station 102 over the channel 108.

The second control unit 434 can be implemented in a number of different manners. For example, the second control unit 434 can be a processor, an embedded processor, a microprocessor, a hardware control logic, a hardware finite state machine, a digital signal processor, or a combination thereof.

The second control unit 434 can include a second controller interface 444. The second controller interface 444 can be used for communication between the second control unit 434 and other functional units in the serving station 106. The second controller interface 444 can also be used for communication that is external to the serving station 106.

The second controller interface 444 can receive information from the other functional units or from external sources, or can transmit information to the other functional units or to external destinations. The external sources and the external destinations refer to sources and destinations external to the serving station 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a micro electromechanical system, optical circuitry, waveguides, wireless circuitry, wireline circuitry, or a combination thereof.

A second storage unit 446 can store the second software 442. The second storage unit 446 can also store the relevant information, such as phone numbers, identification information, information for multiple access, such as code, frequency, or time slot, advertisements, points of interest, navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the communication system 100 is shown with the second storage unit 446 as a single hierarchy storage system, although it is understood that the communication system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory, Flash memory, disk storage, or a volatile storage such as static random access memory.

The second storage unit 446 can include a second storage interface 448. The second storage interface 448 can be used for communication between the location unit 420 and other functional units in the serving station 106. The second storage interface 448 can also be used for communication that is external to the serving station 106.

The second storage interface 448 can receive information from the other functional units or from external sources, or can transmit information to the other functional units or to external destinations. The external sources and the external destinations refer to sources and destinations external to the serving station 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the serving station 106. For example, the second communication unit 436 can permit the serving station 106 to communicate with the mobile station 102 over the channel 108.

The second communication unit 436 can also function as a communication hub allowing the serving station 106 to function as part of the channel 108 and not limited to be an end point or terminal unit to the channel 108. The second communication unit 436 can include active and passive components, such as microelectronics or an antenna, for interaction with the channel 108.

The second communication unit 436 can include a second communication interface 450. The second communication interface 450 can be used for communication between the second communication unit 436 and other functional units in the serving station 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the channel 108 to send information to the serving station 106 in the mobile transmission 408. The serving station 106 can receive information in the second communication unit 436 from the mobile transmission 408 of the channel 108.

The second communication unit 436 can couple with the channel 108 to send information to the mobile station 102 in the station transmission 410. The mobile station 102 can receive information in the first communication unit 416 from the station transmission 410 of the channel 108. The communication system 100 can be executed by the first control unit 412, the second control unit 434, or a combination thereof.

For illustrative purposes, the serving station 106 is shown with the partition having the second user interface 438, the second storage unit 446, the second control unit 434, and the second communication unit 436, although it is understood that the serving station 106 can have a different partition. For example, the second software 442 can be partitioned differently such that some or all of its function can be in the second control unit 434 and the second communication unit 436. Also, the serving station 106 can include other functional units not shown in FIG. 4 for clarity.

The functional units in the serving station 106 can work individually and independently of the other functional units. The serving station 106 can work individually and independently from the mobile station 102 and the channel 108.

For illustrative purposes, the communication system 100 is described by operation of the mobile station 102 and the serving station 106. It is understood that the mobile station 102 and the serving station 106 can operate any of the modules and functions of the communication system 100. For example, the mobile station 102 is described to operate the location unit 420, although it is understood that the serving station 106 can also operate the location unit 420.

For further illustrative purposes, the communication system 100 is described as having the mobile station 102 interacting with the serving station 106 through the channel 108. It is understood that the candidate station 110, having identical or similar components as the serving station 106 can interact with the mobile station 102.

For example, the candidate station 110 can have the second communication unit 436 therein to communicate with the mobile station 102. Also, for example, the candidate station 110 can have the second control unit 434, the second storage unit 446, and the second user interface 438 for carrying on the same functions as the serving station 106.

Figure 5:
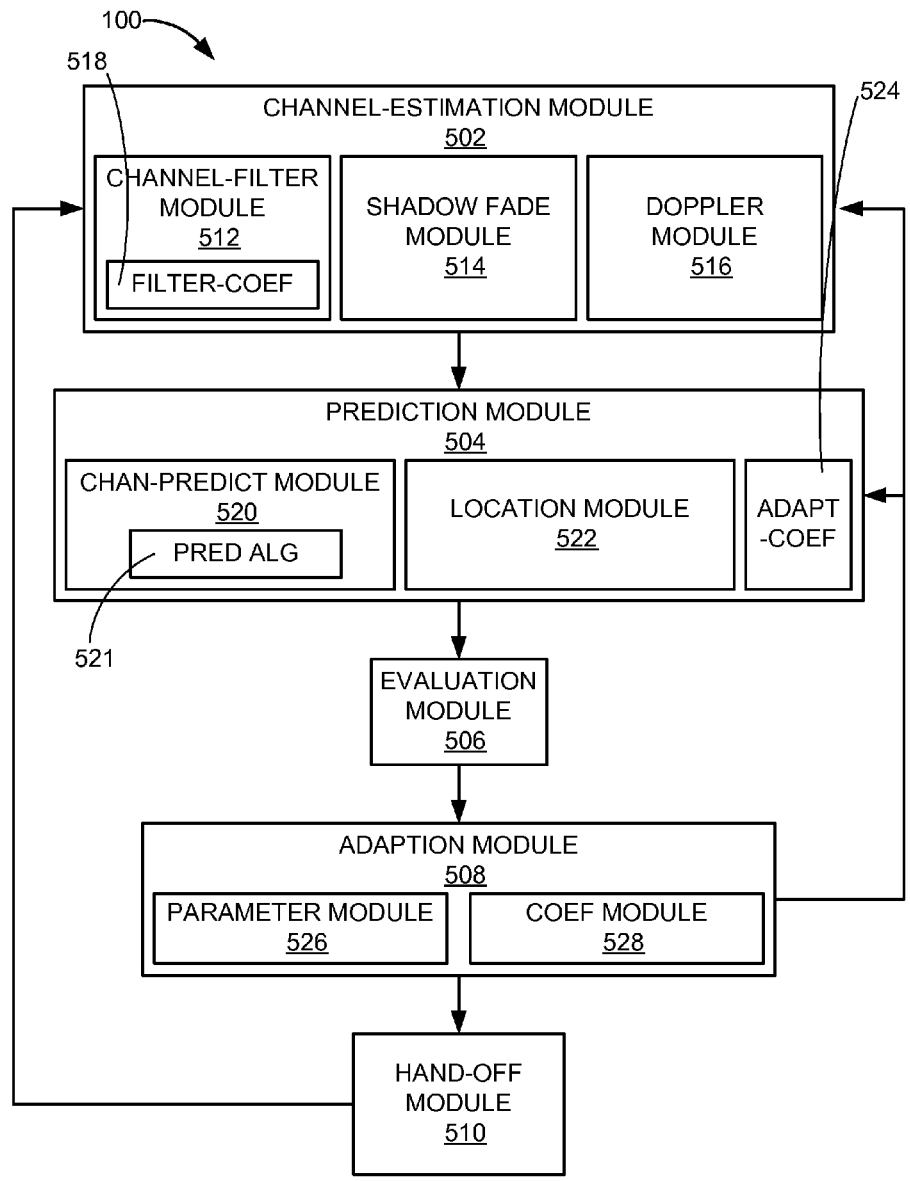
FIG. 5 is a control flow of the communication system.

Referring now to FIG. 5, therein is shown a control flow of the communication system 100. The communication system 100 can have a channel-estimation module 502, a prediction module 504, an evaluation module 506, an adaption module 508, and a hand-off module 510.

The channel-estimation module 502 can be coupled to the prediction module 504, which can be coupled to the evaluation module 506. The evaluation module 506 can be coupled to the adaption module, which can be coupled to the hand-off module 510. The adaption module 508 can also be coupled to the prediction module 504 and the channel-estimation module 502 through a feedback loop, and the hand-off module 510 can also be coupled to the prediction module 504 through another feedback loop.

The channel-estimation module 502 is for estimating the channel 108 of FIG. 1. The channel-estimation module 502 can estimate the channel by using various methods such as the pilot method, a pre-determined method, or combination thereof. For example, the communication system 100 can send a pilot signal, such as a designated tone or a reference signal, which can be used by the channel-estimation module 502 to characterize the channel 108.

Also for example, the channel-estimation module 502 can perform calculations using the received and recorded set of the current signal 308 of FIG. 3, such as frequency and time domain transformations, convolution, transposition, basic mathematical operations, or a combination thereof. The calculations can be performed according to methods such as the least square method, the least mean square (LMS) method, or the minimum mean square error (MMSE) method. The result of the calculation can be the estimation of the channel 108.

The channel-estimation module 502 can also estimate the current reference-signal-received-power 310 of FIG. 3 and the designated tap 312 of FIG. 3 within the channel 108. The channel-estimation module 502 can estimate the current reference-signal-received-power 310 and the designated tap 312 within the channel 108 by eliminating the estimated effects of the channel 108, such as the path-loss 306 of FIG. 3 or the multipath interference 204 of FIG. 2, from the current signal 308.

The current signal 308 received at the mobile station 102 of FIG. 1 is the result of the transmitted signal being affected by the characteristics of the channel 108. The current signal 308 can include interferences resulting from delays and power loss from propagation. After estimating the channel 108, the channel-estimation module 502 can effectively subtract the influences of the channel 108 to calculate the originally transmitted signal.

The channel-estimation module 502 can estimate the designated tap 312 by performing convolution, transformations such as Laplace or Fourier transform, basic mathematical manipulations, or a combination thereof on the received set of the current signal 308. The channel-estimation module 502 can follow a predetermined method or equation to calculate and estimate for removing the effects of the channel 108. Once the effect of the channel 108 is removed, the channel-estimation module 502 can select a portion of the processed signal at a designated time as the designated tap 312.

The channel-estimation module 502 can estimate the current reference-signal-received-power 310 by removing the effects of the channel 108 from the current signal 308. The channel-estimation module 502 can perform a series of mathematical operations to remove the effects of the channel 108.

The channel-estimation module 502 can analyze the portion of the signal used as a reference signal. The channel-estimation module 502 can calculate the power of the data portion within the processed signal specified at a certain time slot, frequency, code, or combination thereof. The resulting power calculation can be the current reference-signal-received-power 310.

The channel-estimation module 502 can use the first control unit 412 of FIG. 4 to perform calculations with the signals received through the first communication unit 416 of FIG. 4. The channel-estimation module 502 can use the methods and equations stored in the first storage unit 414 of FIG. 4 and also store the results of the processes in the first storage unit 414.

The channel-estimation module 502 can have a channel-filter module 512, a shadow fade module 514, and a Doppler module 516. The channel-estimation module 502 can filter the current signal 308, and calculate the delay spread 206 of FIG. 2 and the Doppler frequency 202 of FIG. 2 through these sub-modules.

The channel-filter module 512 is for filtering the current signal 308. The channel-filter module 512 can be a finite impulse response (FIR) or infinite impulse response (IIR) filter circuit, a digital signal processing (DSP) chip for filtering the received signal, or an adaptive filter. The channel-filter module 512 can have filter-coefficients 518 for filtering the current signal.

The channel-filter module 512 can calculate the initial values of the filter-coefficients 518 using a predetermined value, method, or both. The channel-filter module 512 can use a feedback loop for adjusted values of the filter-coefficients 518.

The channel-filter module 512 can eliminate the fast-fade 332 of FIG. 3. The channel-filter module 512 can eliminate the fast-fade 332 by effectively interpolate or remove spikes in the current signal 308 by filtering the current signal 308. The channel-filter module can also eliminate data conversion or reception errors by filtering the signal.

The channel-filter module 512 can use the first control unit 412 to filter the signal. The channel-filter module 512 can also have a separate filter circuit or a DSP chip to filter the signal. The channel-filter module 512 can stored the filtered signal and the filter-coefficients 518 in the first storage unit 414.

The channel-estimation module 502 can also estimate the channel 108 using an adaptive filter implemented through the channel-filter module 512. The channel-filter module 512 can be an adaptive filter, such as least mean square (LMS) or recursive least square (RLS) filter. The filter-coefficients 518 and the data flow can execute the data manipulations such as the LMS or MMSE method for estimating the channel 108.

The shadow fade module 514 is for estimating the channel 108 having the delay spread 206. The shadow fade module 514 can estimate the channel 108 having the delay spread 206 by calculating the delay spread 206 of the current signal 308. The shadow fade module 514 can use the estimations of the channel 108 and the originally transmitted signal, as estimated by the channel-estimation module 502 to calculate the delay spread 206.

For example, the shadow fade module 514 can search the received signals for a pattern of amplitudes, frequencies, or both to find the last repeat of the originally transmitted signal. Also, for example, the shadow fade module 514 can measure the frequency shift of the known portions within the received signals, such as the reference signal portion or the header or sync portion of the data.

The shadow fade module 514 can also calculate the root mean square (RMS) value of the delay spread 206. The shadow fade module 514 can calculate the RMS values for the delay spread 206 recorded over a period of time, selected at random, periodically, or a combination thereof.

The shadow fade module 514 can use the first control unit 412, the first communication unit 416, or a combination thereof to calculate the delay spread 206. For example, the shadow fade module 514 can use the first control unit 412 to calculate the delay spread 206 of the stored signal. Also, for example, the shadow fade module 514 can use the first communication unit 416 to calculate the delay spread 206 as the signals are received. The shadow fade module 514 can store the delay spread 206 along with the corresponding signals in the first storage unit 414 according to time, received order, source, or a combination thereof.

The Doppler module 516 is for calculating the Doppler frequency 202. The Doppler module 516 can calculate the Doppler frequency 202 by calculating the time between the known periodic portions of the current signal 308.

For example, the Doppler module 516 can measure the time between the reference signal portions or the sync signal portions of the current signal 308 and inverse the measured time to find the frequency of the signal. The Doppler module 516 can subtract the calculated frequency from the standard frequency of the signal portions to calculate the Doppler frequency 202.

The Doppler module 516 can calculate the candidate shift 212 of FIG. 2 relative to the candidate station 110 of FIG. 1 and the base shift 210 of FIG. 2 relative to the serving station 106 of FIG. 1. The Doppler module 516 can calculate the Doppler frequency 202 of the signals having the serving station 106 identified as the source within the current signal 308. The Doppler module 516 can set the values of the base shift 210 as the Doppler frequency 202 of the signals originating from the serving station 106.

The Doppler module 516 can repeat the process using the signals from the candidate station 110. The Doppler module 516 can set the values of the candidate shift 212 as the Doppler frequency of the signals originating from the candidate station 110.

The Doppler module 516 can use the first control unit 412, the first communication unit 416, or a combination thereof to calculate the Doppler frequency 202. For example, the Doppler module 516 can use the first control unit 412 to calculate the Doppler frequency 202 of the signals recorded in the first storage unit 414. Also, for example, the Doppler module 516 can use the first communication unit 416 to calculate the Doppler frequency 202 as the signals are received. The Doppler module 516 can store the values of the Doppler frequency 202 in the first storage unit 414.

The channel-estimation module 502 can pass the results of the various calculations and estimations to the prediction module 504. The prediction module 504 can have a channel-predictor module 520 and a location module 522.

The prediction module 504 is for calculating the predicted signal 313 of FIG. 3 within the channel 108. The prediction module 504 can calculate the predicted signal 313 by calculating the weighted sum of the RSRP of the previously received signals. The prediction module 504 can use the autoregressive method for selecting the weights.

For example, the prediction module 504 can use the future tap count 334 of FIG. 3 to calculate the past data points necessary to calculate the predicted signal 313. The prediction module 504 can multiply the previously measured power 316 of FIG. 3 corresponding to the calculation based on the future tap count 334 with the weights resulting from the autoregressive method. The prediction module 504 can sum the multiplied values to calculate the predicted signal 313.

Also, for example, the prediction module 504 can use iterations of the discrete-time Riccati difference equation to predict the predicted signal 313 or use Bayesian models for the prediction. The prediction module 504 can use methods similar to estimating the channel 108 used by the channel-estimation module 502 including the use of filters.

The prediction module 504 can use the first control unit 412 to process the signals received through the first communication unit 416, stored in the first storage unit 414, or a combination thereof to calculate the predicted signal 313. The prediction module 504 can use a digital filter implemented through the first control unit 412 or use methods or equations stored in the first storage unit 414 to calculate the predicted signal 313.

The prediction module 504 can have adaptive-coefficients 524 for calculating the predicted signal 313 or the predicted tap 314 of FIG. 3 using an adaptive filter. The various weights and methods can be implemented as an adaptive filter to calculate the predicted signal 313 or the predicted tap 314. The prediction module 504 can calculate the values of the adaptive-coefficients 524 using predetermined algorithms, values, or both. The prediction module 504 can use a feedback loop to adjust the adaptive-coefficients 524 based on the prediction accuracy 318 of FIG. 3 and the previous values of the predicted signal 313 and the predicted tap 314.

The prediction module 504 can choose a routine for calculating the predicted signal 313 based on the correlation between the previously measured power 316. The prediction module 504 can calculate the correlation using predetermined equations or filter taps. The prediction module 504 can use the correlation between the past signal traits to predict the predicted signal 313. The prediction module 504 can also choose different prediction routine based on the delay spread 206, the Doppler frequency 202, the prediction accuracy 318, or a combination thereof, since they all relate to the distance and signal strength related to the correlation factors.

The prediction module 504 can calculate the predicted tap 314. The calculation of the predicted tap 314 can be done through the functions of the channel-predictor module 520. The channel-predictor module 520 is for calculating the predicted tap 314.

The channel-predictor module 520 can calculate the predicted tap 314 by setting the reference point in the predicted signal 313 as the designated tap 312. The channel-predictor module 520 can go forward in time by the future tap count 334. The channel-predictor module 520 can set value of the predicted tap 314 to be equal to the calculated RSRP in the predicted signal 313 at the sum of the time corresponding to the designated tap 312 and the future tap count 334.

The channel-predictor module 520 can also have a prediction algorithm 521. The prediction algorithm 521 is defined as a method or process for predicting the RSRP of the signals that will be received at the mobile station 102. The channel-predictor module 520 can use the prediction algorithm 521 to calculate the predicted tap 314 by following the method or process specified by the prediction algorithm 521.

For example, the prediction algorithm 521 can be the linear extrapolation method or linear minimum mean square error method. Also, for example, the prediction algorithm 521 can be implemented as adaptive filters using methods such as least mean square or recursive least square method.

The channel-predictor module 520 can further select the prediction algorithm 521. The channel-predictor module 520 can use the feedback information regarding the accuracy of the prediction, such as the prediction accuracy 318, the delay spread 206, or a combination thereof to select the prediction algorithm 521.

For example, the channel-predictor module 520 can have a predetermined sequence of algorithms stored on the first storage unit 414, the second storage unit 446, or both. The channel-predictor module 520 can start with the first algorithm in the sequence as the prediction algorithm 521. The channel-predictor module 520 can select the next in the sequence when the prediction accuracy 318 is greater than the prediction error limit 326 of FIG. 3 or exceeds by a predetermined amount.

Also, for example, the channel-predictor module 520 can have a predetermined range for the delay spread 206 associated with the different algorithms. The channel-predictor module 520 can select the prediction algorithm 521 by having the settings to cause the channel-predictor module 520 to use the algorithm with the associated range that includes value of the delay spread 206.

The channel-predictor module 520 can use the first control unit 412 to calculate the predicted tap 314. The channel-predictor module 520 can access the signals stored in the first storage unit 414 or the signals being received through the first communication unit 416 to calculate the predicted tap 314. The channel-predictor module 520 can stored the calculated values of the predicted tap 314 in the first storage unit 414.

The prediction module 504 can calculate the base reference-signal-received-power 112 of FIG. 1 and the candidate reference-signal-received-power 114 of FIG. 1, or a combination thereof. The prediction module 504 can calculate the predicted signal 313 and the predicted tap 314 originating from the serving station 106 through the channel-predictor module 520. The prediction module 504 can set the RSRP of the resulting predicted signal corresponding to the serving station 106 as the base reference-signal-received-power 112. The prediction module 504 can repeat the process with the channel-predictor module 520 for signals originating from the candidate station of FIG. 1 to calculate the candidate reference-signal-received-power 114.

The prediction module 504 can calculate the predicted signal 313 based on the location, the velocity, or the combination thereof. The prediction module 504 can tune the prediction routines in the channel-predictor module 520 according to the outputs of the location module 522.

The location module 522 is for calculating the location information 338 of FIG. 3, such as coordinates, a velocity, or a combination thereof of the mobile station 102. The location module 522 can calculate the location information 338 using the triangulation method, the Global Positioning System, dead reckoning and tracking algorithm, or combination thereof to locate the mobile station 102.

The location module 522 can use the location unit 420 of FIG. 4 to calculate the location information 338 of the mobile station 102. The location module 522 can also use the location unit 420 to calculate the velocity, the magnitude of the speed and direction of the movement of the mobile station 102 included in the location information 338.

The location module 522 can keep track of the past locations for the mobile station 102 by storing the outputs of the location unit 420 to the first storage unit 414 via the first control unit 412. The location module 522 can also use the first control unit 412 to compare the past location values to the current location from the location unit 420 to calculate the velocity. The location module 522 can also use the accelerometer functions of the location unit 420 and perform integration, derivation, basic mathematic manipulations, or a combination thereof to calculate the velocity of the mobile station 102.

The prediction module 504 can also use the conditions, such as the Doppler frequency 202 or the delay spread 206 to calculate the predicted signal 313 within the channel. The prediction module 504 can use the first control interface 422 of FIG. 4 to access the outputs of the channel-filter module 512, the shadow fade module, the Doppler module, the channel-predictor module 520 and the location module 522.

The prediction module 504 can refine the predicted signal 313, the predicted tap 314, or both using the location information 338 from the location module 522. The prediction module 504 can refine the calculated predictions by comparing the value to the direction of travel.

For example, the prediction module 504 can use the first control unit 412 to compare the velocity to the location of the serving station 106 stored in a database in the first storage unit 414 or the second storage unit 446 of FIG. 4. The prediction module 504 can ignore the predicted signal 313 or the predicted tap 314 if it has stronger RSRP than the current signal 308 when the velocity shows that the mobile station 102 is moving away from the serving station 106.

Also, for example, the prediction module 504 can use the first control unit 412 to increase or decrease the calculated predictions when the velocity and acceleration of the mobile station 102 changes. The prediction module 504 can multiply the calculated predictions by a percentage of the change in magnitude or by a factor based on the amount of change in direction.

The prediction module 504 can pass the calculated predictions to the evaluation module 506 for analysis and evaluation. The evaluation module 506 is for analyzing and evaluating the accuracy of the calculated predictions to determine whether to adjust the parameters for initiating the handover 320 of FIG. 3.

The evaluation module 506 can calculate the difference between the predicted tap 314 and the designated tap 312. The evaluation module 506 can calculate the difference between the predicted tap 314 and the designated tap 312 by calculating the prediction accuracy 318.

The evaluation module 506 can use the first control unit 412 to calculate the difference between the RSRP of the designated tap 312 and the corresponding future tap, both stored in the first storage unit 414. The evaluation module 506 can set the value of the prediction accuracy 318 same as the calculated difference.

For example, for the designated tap 312 at 'k', the evaluation module 506 can subtract the RSRP of the designated tap 312 s[k] from the RSRP value of the predicted tap 314 at k, p[k], to find the prediction accuracy 318. The evaluation module 506 can represent the prediction accuracy 318, such as watts or decibel, or in percentages of the actual signal. Also, for example, the evaluation module can calculate the prediction accuracy 318 by calculating the difference between the RSRP values of the predicted signal 313 and the current reference-signal-received-power 310.

The evaluation module 506 can also calculate the correlation between the RSRP of the designated tap 312 and the corresponding future tap. The correlation levels can be used to evaluate the distance between the mobile station 102 and the serving station 106, which can provide for the reliability of the calculated predictions.

The designated tap 312 represents the estimate of the actually received signal and the future tap represents the calculated predictions of what the received signals would be. Calculating the difference or the correlation between the two can show the accuracy of the calculated predictions in light of the actually received signals. The communication system 100 can adjust the handoff parameters 336 of FIG. 3 to decrease the error tolerances when the calculated predictions are accurate and satisfy the threshold limits as described below.

The evaluation module 506 can calculate the difference between the predictions and the actually received signals from both the serving station 106 and the candidate station. The evaluation module 506 can calculate the difference between the base reference-signal-received-power 112 and the current reference-signal-received-power 310 by subtracting one from the other.

In the same way, the evaluation module 506 can calculate the difference or the correlation between the candidate reference-signal-received-power 114 and the current reference-signal-received-power 310. The evaluation module 506 can also calculate the difference or the correlation between the base reference-signal-received-power 112 or RSRPc and the RSRP of the designated tap 312, the predicted tap 314, the previously measured power 316, or a combination thereof.

The evaluation module 506 can have a predefined format for calculating the prediction accuracy 318. For example, the evaluation module 506 can calculate the prediction accuracy 318 with the base reference-signal-received-power 112 of the predicted tap 314 and the current reference-signal-received-power 310 or with the designated tap 312 and the candidate reference-signal-received-power 114. Also, for example, the evaluation module 506 can be predetermined to use the highest value of the various difference calculations as the prediction accuracy 318.

The evaluation module 506 can evaluate the accuracy of the predictions by comparing the prediction accuracy 318 with the prediction error limit 326. The evaluation module 506 can signal or flag the adaption module 508 to adjust the handoff parameters 336 for initiating the handover 320 when the prediction accuracy 318 is lower than the prediction error limit 326. The evaluation module 506 can signal or flag the adaption module 508 to perform other functions when the prediction accuracy 318 is equal to or greater than the prediction error limit 326.

The evaluation module 506 can also evaluate the accuracy of the predicted signal 313 with the delay spread 206 and the Doppler frequency 202. The evaluation module 506 can evaluate the accuracy by using the first control unit 412 to compare the delay spread 206 with the reflection threshold 328 of FIG. 3 and the Doppler frequency 202 with the Doppler threshold 330 of FIG. 3, both stored in the first storage unit 414.

The evaluation module 506 can signal or flag the adaption module 508 to adjust the handoff parameters 336 when the delay spread 206 is greater than the reflection threshold 328, when the Doppler threshold 330 is greater than the Doppler threshold 330, or when both conditions are satisfied. The evaluation module 506 can signal or flag the adaption module 508 to perform other functions otherwise.

The evaluation of the delay spread 206 can represent the condition of the channel 108. The evaluation module 506 can evaluate the channel 108 as having too much interference and not reliable when the delay spread 206 is greater than the reflection threshold 328. The communication system 100 can adjust handoff parameters 336 to quickly change to a different channel having less interference.

The evaluation of the Doppler frequency 202 can represent the mobility of the mobile station 102. The evaluation module 506 can evaluate the mobile station 102 as moving fast and likely to soon move out of the effective signal range of the serving station 106 when the Doppler frequency 202 exceeds the Doppler threshold 330.

The evaluation module 506 can compare the candidate shift 212, the base shift 210, or both with the Doppler threshold 330 using the first control unit 412. For example, the evaluation module 506 can be predetermined to compare either the candidate shift 212 or the base shift 210 with the Doppler threshold 330. Also, for example, the evaluation module 506 can compare both and only notify the adaption module 508 to adjust the handoff parameters 336 when the base shift 210 exceeds the Doppler threshold 330 but the candidate shift 212 is below.

The evaluation module 506 can also be predetermined to use only the prediction comparisons or the condition comparisons, or both. For example, the evaluation module 506 can be predetermined to notify the adaption module 508 only based on the evaluation of the predicted tap 314 or only based on the evaluation of the delay spread 206 and the Doppler frequency 202. Also, for example, the evaluation module 506 can be predetermined to notify the adaption module 508 when both sets of conditions are satisfied.

The evaluation module 506 can notify the adaption module 508 to take appropriate actions based on the calculations and evaluations of the evaluation module 506. The adaption module 508 is for adjusting the handoff parameters 336 when the accuracy of the predicted signal 313 is within a threshold range for communicating through the mobile station 102.

The adaption module 508 can receive a signal or a flag from the evaluation module 506 to signify whether to adjust the handoff parameters 336. The adaption module 508 can also poll, ask, or watch the evaluation module 506 for the results of the various calculations, comparisons, and evaluations discussed above and stored in the first storage unit 414.

The adaption module 508 can adjust the handoff parameters 336 with the first control unit 412 when the prediction accuracy 318 is less than the prediction error limit 326. For example, the adaption module 508 can adjust the handoff parameters 336 when the prediction accuracy 318 of the predicted tap 314 is less than the prediction error limit 326. Also, for example, the adaption module 508 can adjust the handoff parameters 336 when the delay spread 206 is greater than the reflection threshold 328, when the Doppler frequency 202 is greater than the Doppler threshold 330, or when both conditions are satisfied.

The adaption module 508 can have a parameter module 526 and a coefficient module 528. The parameter module 526 is for adjusting the handoff parameters 336 when the conditions are satisfied. The parameter module 526 can adjust the handoff parameters 336 by increasing or decreasing the handoff parameters 336 by a predetermined amount. For example, the parameter module 526 can increase or decrease the time-to-trigger 324 of FIG. 3 or the hysteresis level 322 of FIG. 3 by an amount or percentage predetermined by the user, the software manufacturer, the systems manufacturer or operator, or a combination thereof.

As further example, the parameter module 526 can decrease the time-to-trigger 324 0.5 milliseconds when the prediction accuracy 318 is less than the prediction error limit 326 for 5 consecutive iterations or taps. Also, as further example, the parameter module 526 can decrease the hysteresis level 322 25% or adaptively calculate the optimal value for the hysteresis level 322 using an error prediction model when the delay spread 206 is greater than the reflection threshold 328 and the Doppler frequency 202 is greater than the Doppler threshold 330.

The coefficient module 528 is for adjusting the filter-coefficients 518 when the prediction accuracy 318 of the predicted signal 313 is outside the threshold range. The coefficient module 528 can adjust the filter-coefficients 518 when the prediction accuracy 318 is greater than the prediction error limit 326, when the delay spread 206 is less than the reflection threshold 328, the Doppler frequency 202 is less than the Doppler threshold 330, or a combination thereof.

The coefficient module 528 can use a predetermined method or value to adjust the filter-coefficients 518. For example, the coefficient module 528 can increase the filter-coefficients 518 be a set amount, such as 0.1 or 10%, each time the prediction accuracy 318 is greater than the prediction error limit 326. Also, for example, the coefficient module 528 can use a match filter method or recalculate the coefficients for a second order Butterworth filter when the delay spread 206 is less than the reflection threshold 328.

The coefficient module 528 can also flag the prediction module 504 to adjust the adaptive-coefficients. The coefficient module 528 can set a flag or pass a signal, or pass the prediction accuracy 318 or the difference or correlation between the prediction accuracy 318 and the prediction error limit 326 to the prediction module 504.

The coefficient module 528 can also adjust the window size for calculating the predicted tap 314 and the prediction accuracy 318. The coefficient module 528 can adjust the window size by adjusting the future tap count 334.

For example, the coefficient module 528 can increase the future tap count 334 higher when the prediction accuracy 318 is lower the prediction error limit 326, when the Doppler frequency 202 or the delay spread 206 is below their respective thresholds, or when both sets of conditions are satisfied. Also, for example, the coefficient module 528 can decrease the future tap count 334 when the Doppler frequency 202 and the delay spread 206 are both greater than their respective thresholds.

The coefficient module 528 can adjust the future tap count 334 based on the correlation between taps. The coefficient module 528 can also flag or signal the channel-estimation module 502 to change the channel estimation routine based on the correlation between the taps, which can be based on the prediction accuracy 318.

Once the handoff parameters 336 have been adjusted by the adaption module 508, the hand-off module 510 can use the adjusted values. The hand-off module 510 is for comparing the base reference-signal-received-power 112, the candidate reference-signal-received-power 114, or a combination thereof and perform the handover 320 based on the comparison.

For example, the hand-off module 514 can compare the base reference-signal-received-power 112 and the candidate reference-signal-received-power 114 to determine if the candidate reference-signal-received-power 114 is greater than the base reference-signal-received-power 112 by at least the hysteresis level 322. The hand-off module 514 can initiate the handover 320 if the difference between the base reference-signal-received-power 112 and the candidate reference-signal-received-power 114 exceeds the magnitude of the hysteresis level 322 for the duration equal to or greater than the time-to-trigger 324.

Also, for example, the hand-off module 510 can initiate the handover when the base reference-signal-received-power 112 is lower than the hysteresis level 322, the candidate reference-signal-received-power 114 is greater than the hysteresis level 322, or both. The hand-off module 510 can initiate the handover when the conditions are satisfied for a single sample or tap, or for a period of time, such as the time-to-trigger 324.

The hand-off module 514 can initiate the handover 320 by reporting to the serving station 106 a request or the various results of the calculation. The hand-off module 514 can perform the handover 320 by following the predetermined protocol for the handover 320. The protocol can include waiting for the reply from the serving station 106, requesting and confirming permission from the candidate station 110, establishing the communication link 208 of FIG. 2 with the candidate station, returning control to the channel-estimation module to repeat the process for the handover 320, or a combination thereof.

The hand-off module 510 can transfer the communication link 208 through a hysteresis-based method having an upper and a lower limit, such as when the RSRPb is below a threshold level, the RSRPc is above a threshold level, or both. The hand-off module 510 can also transfer the communication link 208 through an adaptive method, such as using the method for adaptively finding the optimum value of the hysteresis level 322 transferring a communication link through an error prediction model. Further, the hand-off module 510 can use protocols for the handover 320 that is hysteresis-based or adaptive in nature.

It has been discovered that the present invention provides the communication system 100 for decreased number of handovers, which results in efficient use of the system resources. The evaluation module 506 and the adaption module 508 provide for the decreased number of handovers by controlling the handoff parameters 336 to only perform the handover 320 when the communication system 100 can accurately predict the strength of the predicted signal 313 and determines that the handover 320 is necessary.

It has further been discovered that the present invention provides the communication system 100 for decreased number of dropped calls. The evaluation module 506 and the adaption module 508 provide for the decrease in the number of dropped calls by accurately predicting bad signals or when the mobile station 102 is moving too fast to normally sustain communication and adjusting the handoff parameters 336 for earlier handover.

It has been discovered that the present invention provides the communication system 100 for faster and reliable base station performance by relieving the base stations of calculation burdens. The channel-estimation module 502, the prediction module 504, and the adaption module 508 provide the relief in calculation burden by accurately estimating the channel 108 and the predicted tap 314 through a recurring feedback process.

For illustrative purposes, the communication system 100 has been described as the mobile station 102 estimating the channel, calculating the predictions, evaluating the performance, and adjusting the handoff parameters 336. However, it is understood that the communication system 100 can be implemented differently.

For example, the serving station 106 can have a channel model specific to the serving station 106 that the mobile station 102 can use instead of estimating the channel. Also, for example, the communication system 100 can use the second control unit 434 of FIG. 4, the second storage unit 446 to perform the estimation, calculation and the evaluation.

Also, it is understood that the functions and the modules can be implemented differently. For example, the modules can share the responsibilities, such as combining the channel-estimation module 502 and the prediction module 504 through a series of filters. Also, for example, the mobile station 102 can have the evaluation module 506 can the adaption module 508 and the base stations can have the channel-estimation module 502 and the prediction module 504.

Figure 6:
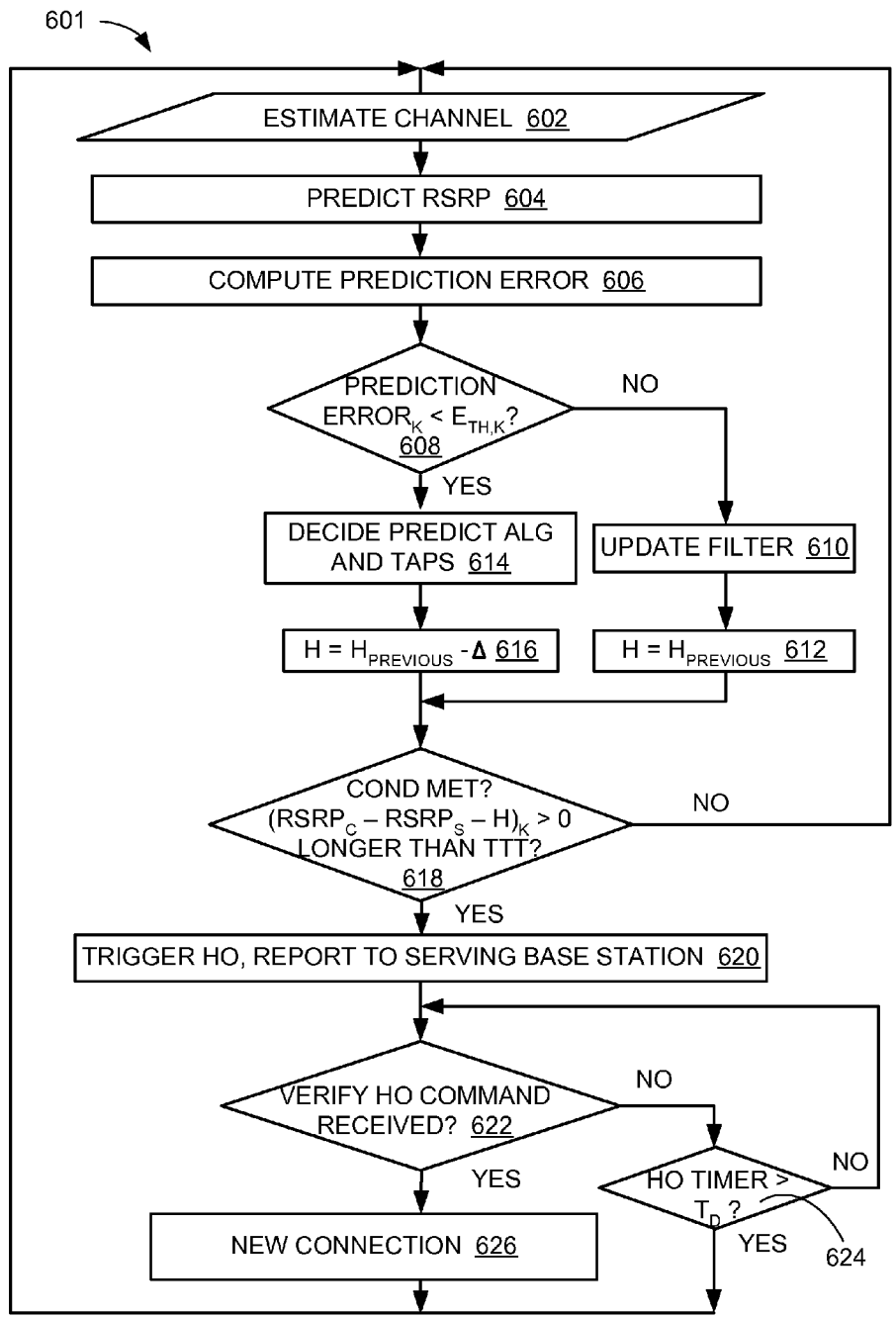
FIG. 6 is a first operational flowchart of the communication system of FIG. 1.

Referring now to FIG. 6, therein is shown a first operational flowchart 601 of the communication system 100 of FIG. 1. The operational flowchart 601 of the communication system 100 depicts an estimate channel block 602.

The channel-estimation module 502 of FIG. 5 can perform the process of the estimate channel block 602 and estimate the channel for the Kth tap. The channel-estimation module 502 can perform the process by estimating the channel 108 of FIG. 1. The channel-estimation module can also perform the process by estimating the designated tap 312 of FIG. 3 for the Kth tap.

The flow proceeds to a predict RSRP block 604. The prediction module 504 of FIG. 5 can perform the process of the predict RSRP block 604 and predict the RSRP up to (K+N)th tap. The prediction module 504 can perform the process by calculating the predicted signal 313 of FIG. 3 and the predicted tap 314 of FIG. 3. The prediction module 504 can calculate the predicted tap 314 at a time or tap that is equivalent to the sum of the tap or time of the designated tap 312 and N. The value of N can denote the value of the future tap count 334 of FIG. 3.

The flow proceeds to a compute prediction error block 606. The evaluation module 506 of FIG. 5 can perform the process of the compute prediction error block 606 and compute the prediction error for the Kth tap. The evaluation module can perform the process by calculating the prediction accuracy 318 of FIG. 3.

The flow proceeds to a compare prediction error and error threshold block 608. The evaluation module 506 can also perform the process of the compare prediction error and error threshold block 608 and determine whether the prediction error for K is less than error threshold for Kth tap. The evaluation module 506 can perform the process by comparing the prediction accuracy 318 to the prediction error limit 326 of FIG. 3.

The flow proceeds to an update filter block 610 if the prediction error for K is not less than error threshold for K. The coefficient module 528 of FIG. 5 can perform the process of the update filter block 610 when the prediction accuracy 318 is not less than the prediction error limit 326. The coefficient module 528 can perform the process by adjusting the filter-coefficients 518 of FIG. 5 or flagging the prediction module 504 to adjust the adaptive-coefficients 524 of FIG. 5.

From the update filter block 610, the flow proceeds to a retain hysteresis level block 612. The adaption module 508 of FIG. 5 can perform the process of the retain the hysteresis level block 612 by retaining the previous hysteresis level, not utilizing the coefficient module 528 and not altering the hysteresis level 322 of FIG. 3.

When the prediction error for K is less than the error threshold for K, the flow proceeds from the compare prediction error and error threshold block 608 to a decide prediction algorithm and taps block 614. The coefficient module 528 can perform the process of the decide prediction algorithm and taps block 614 when the prediction accuracy 318 is less than the prediction error limit 326. The coefficient module 528 can perform the process by flagging the channel-prediction module 520 of FIG. 5 to determine and select the prediction algorithm 521 and by adjusting the future tap count 334.

From the decide prediction algorithm and taps block 614, the flow proceeds to a decrease hysteresis level block 616. The parameter module 526 can perform the process of the decrease hysteresis level block 616. The parameter module 526 can lower the hysteresis level 322 by a predetermined amount or using an adaptive algorithm.

The flow proceeds from the two hysteresis level blocks 612 and 616 to a check condition met block 618. The hand-off module 510 of FIG. 5 can perform the process of the check condition met block 618 by determining whether the hysteresis condition has been met for longer than the TTT.

The hand-off module 510 can perform the process by evaluating a series of consecutive values for the previously measured power 316 of FIG. 3 and the designated tap 312. The hand-off module 510 can determine whether there is a series of taps where the candidate reference-signal-received-power 114 of FIG. 1 is greater than the base reference-signal-received-power 112 of FIG. 1 by at least the hysteresis level 322 for a period of time longer than the time-to-trigger 324 of FIG. 3

If the candidate reference-signal-received-power 114 has not been above the base reference-signal-received-power 112 by at least the hysteresis level 322 for the duration exceeding the time-to-trigger 324, the flow proceeds back to the estimate channel block 602. Thus, the communication system 100 can repeat the process from the beginning if the hand-off conditions have not been met.

If the candidate reference-signal-received-power 114 has been above the base reference-signal-received-power 112 by at least the hysteresis level 322 for the duration exceeding the time-to-trigger 324, the flow proceeds to a trigger handover block 620. The hand-off module 510 can perform the process of initiating the handover 320 of FIG. 3 in the trigger handover block 620 and trigger the handover and report to the serving base station. The hand-off module 510 can perform the process by sending a request for the handover 320 to the serving station 106 of FIG. 1.

The flow proceeds to a verify handoff command receipt block 622. The hand-off module 510 can perform the process of the verify handoff command receipt block 622 and determine whether handoff command has been received by watching and polling the messages received through the first communication unit 416 of FIG. 4.

If the handoff command has not been received, the flow proceeds to a handoff timer comparison block 624. The hand-off module 510 can perform the process of the handoff timer comparison block 624 and determine whether the handoff timer has timed out when the hand-off module does not perceive an acknowledgement or permission from the serving station 106 for the handover 320. The hand-off module 510 can compare the time stamp or the internal counter to a predetermined threshold defining the duration of the response period of the serving station 106.

If the handoff timer has not timed out, the flow proceeds back to the verify handoff command receipt block 622. The hand-off module 510 can loop between the two blocks for up to the predetermined duration of the response period according to the protocol for the handover 320.

If the handoff command has been received, the flow proceeds from the verify handoff command receipt block 622 to a new connection block 626. The hand-off module 510 can perform the process of the new connection block 626 and connect to new serving cell and update cell lists. The hand-off module 510 can perform the process by following the protocol to establish the communication link 208 of FIG. 2 with the candidate station 110 of FIG. 1 and breaking the existing link with the serving station 106.

From the new connection block 626 and from the handoff timer comparison block 624 when the handoff time times out, the flow proceeds back to the estimate channel block 602. When the handover 320 is successfully completed or when the serving station 106 does not respond or grant the handover 320, the communication system 100 can repeat the process from the beginning to adaptively determine whether another handover can be required.

It has been discovered that the communication system 100 provide for decreased dropped calls and system tie-up time with the mobile station 102 of FIG. 1 connected to both the serving station 106 can the candidate station 110. The blocks 608, 614, and 616 provide the decrease in dropped calls and system idle time by accurately predicting the channel 108 and the predicted tap 314 and lowering the hysteresis levels to take advantage of the accurate predictions.

Figure 7:
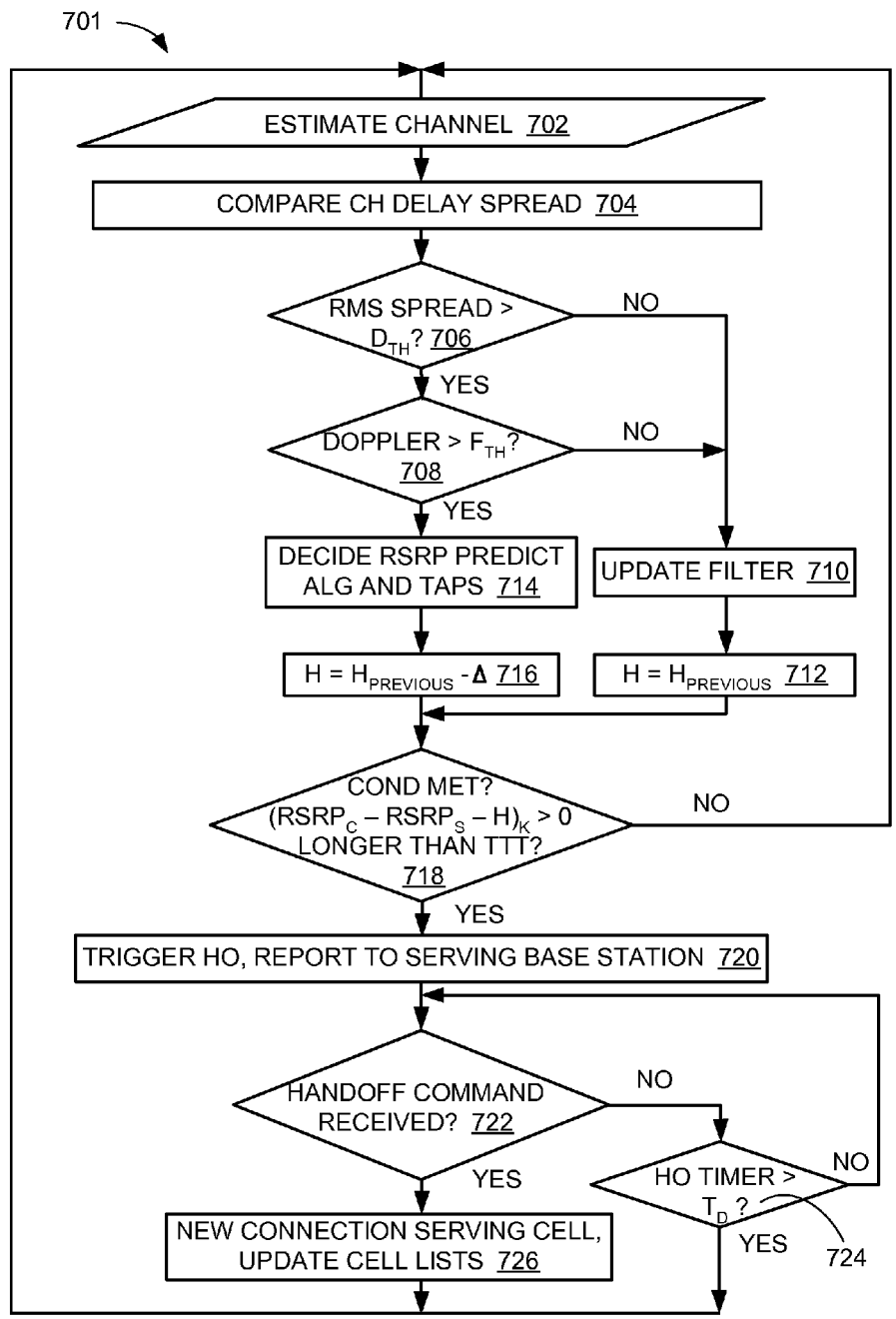
FIG. 7 is a second operational flowchart of the communication system of FIG. 1.

Referring now to FIG. 7, therein is shown a second operational flowchart 701 of the communication system 100 of FIG. 1. The operational flowchart 701 of the communication system 100 depicts an estimate channel block 702.

The channel-estimation module 502 of FIG. 5 can perform the process of the estimate channel block 702. The channel-estimation module 502 can perform the process by estimating the channel 108 of FIG. 1.

The flow proceeds to a compare channel delay spread block 704. The evaluation module 506 of FIG. 5 can perform the process of the compare channel delay spread block 704. The shadow fade module 514 of FIG. 5 can calculate the delay spread 206 of FIG. 2 and the evaluation module 506 can compare the delay spread 206 to the reflection threshold 328 of FIG. 3.

The flow proceeds to a delay comparison block 706. The evaluation module 506 can perform the process of the delay comparison block 706 and determine whether RMS delay is greater than the threshold. The evaluation module 506 can determine whether the delay spread 206 exceeds the reflection threshold 328.

When the delay spread 206 exceeds the reflection threshold 328, the flow proceeds to a Doppler comparison block 708. The Doppler module 508 of FIG. 5 can calculate the Doppler frequency 202 of FIG. 2 and the evaluation module 506 can determine whether the Doppler frequency 202 exceeds the Doppler threshold 330 of FIG. 3.

When the delay spread 206 does not exceed the reflection threshold 328 or when the Doppler frequency 202 does not exceed the Doppler threshold 330, the flow proceeds to an update filter block 710. The coefficient module 528 of FIG. 5 can perform the process of the update filter block 710. The coefficient module 528 can perform the process by adjusting the filter-coefficients 518 of FIG. 5 or flagging the prediction module 504 to adjust the adaptive-coefficients 524 of FIG. 5.

The flow proceeds from the update filter block 710 to a hysteresis level block 712. The adaption module 508 can perform the process of the retain hysteresis level block 712 by not utilizing the coefficient module 528 and not altering the hysteresis level 322 of FIG. 3.

When the delay spread 206 and the Doppler frequency 202 is greater than their respective thresholds, the flow proceeds from the Doppler comparison block 708 to a decide prediction algorithm and taps block 714. The coefficient module 528 can perform the process of the decide prediction algorithm and taps block 714 when the delay spread 206 exceeds the reflection threshold 328 and the Doppler frequency 202 exceeds the Doppler threshold 330. The coefficient module 528 can perform the process by flagging the channel-prediction module 520 of FIG. 5 to determine and select the prediction algorithm 521 of FIG. 5 and by adjusting the future tap count 334 of FIG. 3.

From the decide prediction algorithm and taps block 714, the flow proceeds to a decrease hysteresis level block 716. The parameter module 526 can perform the process of the decrease hysteresis level block 716. The parameter module 526 can lower the hysteresis level 322 by a predetermined amount or using an adaptive algorithm.

The flow proceeds from the two hysteresis level blocks 712 and 716 to a check hysteresis condition block 718. The hand-off module 510 can perform the process of the check hysteresis condition block 718 and determine whether the hysteresis condition has been met for longer than TTT.

The hand-off module 510 can perform the process by evaluating a series of consecutive values for the previously measured power 316 of FIG. 3 and the designated tap 312 of FIG. 3. The hand-off module 510 can determine whether there is a series of taps where the candidate reference-signal-received-power 114 of FIG. 1 is greater than the base reference-signal-received-power 112 of FIG. 1 by at least the hysteresis level 322 for a period of time longer than the time-to-trigger 324 of FIG. 3

If the candidate reference-signal-received-power 114 has not been above the base reference-signal-received-power 112 by at least the hysteresis level 322 for the duration exceeding the time-to-trigger 324, the flow proceeds back to the estimate channel block 702. Thus, the communication system 100 can repeat the process from the beginning if the hand-off conditions have not been met.

If the candidate reference-signal-received-power 114 has been above the base reference-signal-received-power 112 by at least the hysteresis level 322 for the duration exceeding the time-to-trigger 324, the flow proceeds to a trigger handover block 720. The hand-off module 510 can perform the process of initiating the handover 320 of FIG. 3 in the trigger handover, and report to serving base station block 720. The hand-off module 510 can perform the process by sending a request for the handover 320 to the serving station 106 of FIG. 1.

The flow proceeds to a handoff command reception block 722. The hand-off module 510 can perform the process of the handoff command reception block 722 and determine whether handoff command has been received by watching and polling the messages received through the first communication unit 416 of FIG. 4.

If the handoff command has not been received, the flow proceeds to a handoff timer block 724. The hand-off module 510 can perform the process of the handoff timer block 724 and determine whether the handoff timer has timed out when the hand-off module does not perceive an acknowledgement or permission from the serving station 106 for the handover 320. The hand-off module 510 can compare the time stamp or the internal counter to a predetermined threshold defining the duration of the response period of the serving station 106.

If the handoff timer has not timed out, the flow proceeds back to the handoff command reception block 722. The hand-off module 510 can loop between the two blocks for up to the predetermined duration of the response period according to the protocol for the handover 320.

If the handoff command has been received, the flow proceeds from the handoff command reception block 722 to a new connection block 726. The hand-off module 510 can perform the process of the new connection block 726 and connect to new serving cell and update cell lists. The hand-off module 510 can perform the process by following the protocol to establish the communication link 208 of FIG. 2 with the candidate station 110 of FIG. 1 and breaking the existing link with the serving station 106.

From the new connection block 726 and from the handoff timer block 724 when the handoff time times out, the flow proceeds back to the estimate channel block 702. When the handover 320 is successfully completed or when the serving station 106 does not respond or grant the handover 320, the communication system 100 can repeat the process from the beginning to adaptively determine whether another handover can be required.

It has been discovered that the communication system 100 provide for decreased dropped calls and system tie-up time with the mobile station 102 of FIG. 1 connected to both the serving station 106 can the candidate station 110. The blocks 708, 714, and 716 provide the decrease in dropped calls and system idle time by accurately predicting quality of the predicted tap 314 of FIG. 3 based on the mobility of the mobile station 102 and lowering the hysteresis levels to take advantage of the accurate predictions.

The communication system 100 performing the process described in the second operational flowchart 701 changes the handoff parameters 336, such as the hysteresis level 322 and the time-to-trigger 324, if both the delay spread 206 is long and the mobility of the mobile station 102 is high. The delay spread 206 is long when the delay spread 206 exceeds the reflection threshold 328 and the mobility is high when the Doppler shift 202 exceeds the Doppler threshold 330.

In such a case, it is beneficial to trigger the handover 320 earlier than normal by predicting the RSRP values as the current reference-signal-received-power 310 will likely be rapidly decreasing. Also, as the RSRP prediction error is dependent upon the correlation level between the RSRP taps, the communication system 100 can choose a different prediction algorithm per channel condition and adjust the future tap count 334 to provide for decreased dropped calls and system tie-up time.

The physical transformation of the delay spread 206 and the path-loss 306, such as the signal interference experienced by the waves of the communication signal, results in movement in the physical world, such as static noise on the phone call or displaying of erroneous or incomplete information. The movement in the physical world can be fed back to the communication system 100 to further operate the communication system 100. For example, the delay spread 206 and the path-loss 306 can be used to adjust trigger the handover 320 quicker and minimize the signal interference.

Also, the physical transformation of the mobile station 102, such as location and distance relative to the serving station 106, results in movement in the physical world, such as reallocation and reestablishment of the serving station 106. The movement in the physical world can be fed back to the communication system 100 to further operate the communication system 100. For example, the communication system 100 can reevaluate the handoff parameters 336 based on reestablishing the serving station 106.

It is understood that the various modules described above can be implemented as hardware in the first control unit 412 of FIG. 4, the second control unit 434 of FIG. 4, or both. The different modules can also be implemented as separate hardware mechanism, circuit, or device (not illustrated) in the mobile station 102, the base stations, or a combination thereof.

Figure 8:
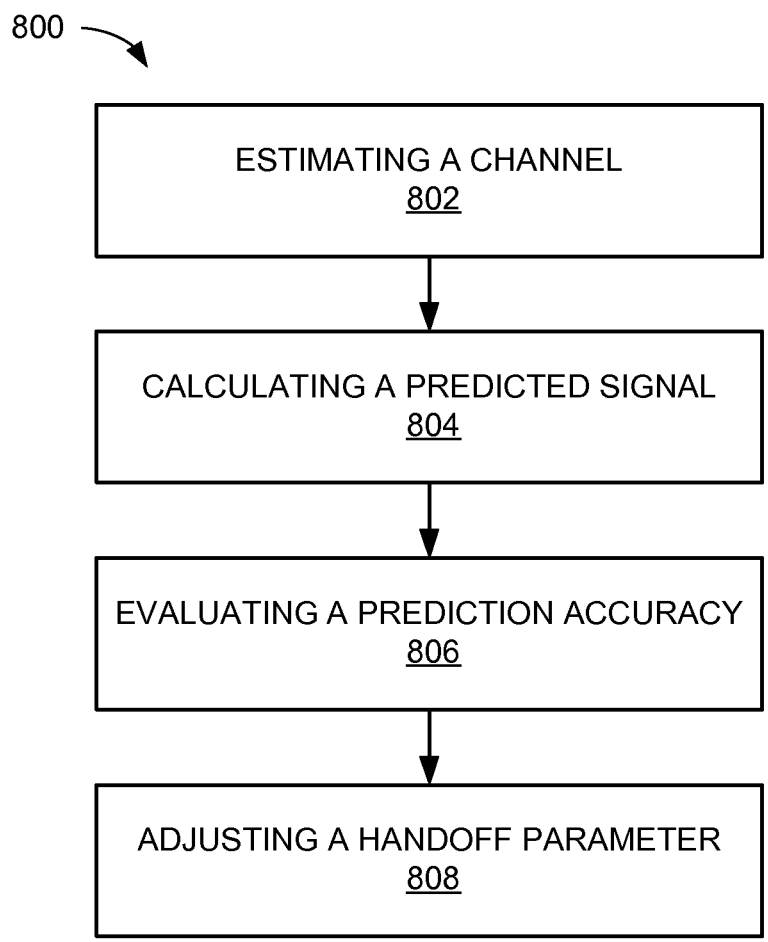
FIG. 8 is a flow chart of a method of operation of a communication system in a further embodiment of the present invention.

Referring now to FIG. 8, therein is shown a flow chart of a method 800 of operation of a communication system in a further embodiment of the present invention. The method 800 includes: estimating a channel in a block 802; calculating a predicted signal within the channel in a block 804; evaluating a prediction accuracy of the predicted signal in a block 806; and adjusting a handoff parameter when the prediction accuracy of the predicted signal is within a threshold range for communicating through a mobile station in a block 808.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the communication system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing memory system.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description.

Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
   estimating a channel including calculating a delay spread of a current signal;
   calculating a predicted signal within the channel;
   evaluating a prediction accuracy of the predicted signal; and
   adjusting a handoff parameter with a control unit when the prediction accuracy of the predicted signal is within a threshold range and when the delay spread is greater than a reflection threshold for communicating through a mobile station.

2. The method as claimed in claim 1 wherein:
   calculating the predicted signal includes calculating a predicted tap; and
   adjusting the handoff parameter includes adjusting the handoff parameter when the prediction accuracy of the predicted tap is less than a prediction error limit.

3. The method as claimed in claim 1 wherein:
   calculating the predicted signal includes calculating a Doppler frequency of the current signal; and
   adjusting the handoff parameter includes adjusting the handoff parameter when the Doppler frequency is greater than a Doppler threshold.

4. The method as claimed in claim 1 wherein adjusting the handoff parameter includes adjusting a future tap count, a time-to-trigger, a hysteresis level, or a combination thereof for communicating through the mobile station.

5. The method as claimed in claim 1 further comprising:
   calculating a location information; and
   wherein:
   calculating the predicted signal includes calculating the predicted signal based on the location information.

6. The method as claimed in claim 1 further comprising:
   receiving the current signal;
   wherein:
   evaluating the prediction accuracy of the predicted signal includes calculating a difference between the current signal and the predicted signal.

7. The method as claimed in claim 1 further comprising:
   receiving the current signal;
   filtering the current signal; and
   adjusting a filter-coefficient when the prediction accuracy of the predicted signal is outside the threshold range.

8. The method as claimed in claim 1 further comprising transferring a communication link through a hysteresis-based method including an upper and a lower limit.

9. The method as claimed in claim 1 further comprising transferring a communication link through an adaptive method.

10. The method as claimed in claim 1 wherein:
    estimating the channel includes estimating a designated tap within a channel;
    calculating the predicted signal includes calculating a predicted tap;
    evaluating the prediction accuracy includes calculating a difference between the predicted tap and the designated tap; and
    adjusting the handoff parameter includes adjusting the handoff parameter when the difference is less than a prediction error limit for communicating through a mobile station.

11. The method as claimed in claim 10 wherein:
    estimating the designated tap includes estimating a current reference-signal-received-power;
    calculating the predicted tap includes calculating a base reference-signal-received-power, a candidate reference-signal-received-power, or a combination thereof; and
    calculating the difference includes calculating the difference between the current reference-signal-received-power and the base reference-signal-received-power, the difference between the current reference-signal-received-power and the candidate reference-signal-received-power, or combination thereof.

12. The method as claimed in claim 10 wherein calculating the predicted tap includes calculating an adaptive-coefficient.

13. A method of operation of a communication system comprising:
    estimating a channel including calculating a delay spread of a current signal;
    calculating a Doppler frequency of the current signal within the channel;
    evaluating a prediction accuracy of a predicted signal with the delay spread and the Doppler frequency; and
    adjusting a handoff parameter with a control unit when the delay spread is greater than a reflection threshold and the Doppler frequency is greater than a Doppler threshold for communicating through the mobile station.

14. The method as claimed in claim 13 wherein:
    calculating the Doppler frequency includes calculating a candidate shift relative to a candidate station and a base shift relative to a serving station; and
    evaluating the prediction accuracy of the predicted signal includes comparing the candidate shift and the base shift.

15. A communication system comprising:
    a communication unit configured to communicate a current signal; and
    a control unit, coupled to the communication unit, configured to:
    estimate a channel including calculating a delay spread of the current signal;
    calculate a predicted signal within the channel;
    evaluate the prediction accuracy of the predicted signal; and
    adjust a handoff parameter when the prediction accuracy of the predicted signal is within a threshold range and when the delay spread is greater than a reflection threshold for communicating through a mobile station.

16. The system as claimed in claim 15 wherein the control unit is configured to:
    calculate a predicted tap; and
    adjust the handoff parameter when the prediction accuracy of the predicted tap is less than a prediction error limit.

17. The system as claimed in claim 15 wherein the control unit is configured to:
    calculate a Doppler frequency of the current signal; and
    adjust the handoff parameter when the Doppler frequency is greater than a Doppler threshold.

18. The system as claimed in claim 15 wherein the control unit is configured to adjust a future tap count, a time-to-trigger, a hysteresis level, or a combination thereof for communicating through the mobile station.

19. The system as claimed in claim 15 wherein the control unit is configured to:
calculate a location information; and
calculate the predicted signal based on the location information.

20. The system as claimed in claim 15 wherein:
the communication unit is configured to receive the current signal; and
the control unit is configured to calculate a difference between the current signal and the predicted signal.

21. The system as claimed in claim 15 wherein:
the communication is configured to receive the current signal; and
the control unit is configured to:
filter the current signal; and
adjust a filter-coefficient when the prediction accuracy of the predicted signal is outside the threshold range.

22. The system as claimed in claim 15 wherein the communication unit is configured to transfer a communication link through a hysteresis-based method including an upper and a lower limit.

23. The system as claimed in claim 15 wherein the communication unit is configured to transfer a communication link through an adaptive method.

24. The system as claimed in claim 15 wherein the control unit is configured to:
estimate a designated tap within a channel;
a calculate a predicted tap;
calculate a difference between the predicted tap and the designated tap; and
adjust a handoff parameter when the difference is less than a prediction error limit for communicating through a mobile station.

25. The system as claimed in claim 24 wherein the control unit configured to:
estimate a current reference-signal-received-power;
calculate a base reference-signal-received-power, a candidate reference-signal-received-power, or a combination thereof; and
calculate the difference between the current reference-signal-received-power and the base reference-signal-received-power, the difference between the current reference-signal-received-power and the candidate reference-signal-received-power, or combination thereof.

26. The system as claimed in claim 24 wherein the control unit is configured to calculate an adaptive-coefficient.

27. The system as claimed in claim 15 wherein the control unit is configured to:
calculate a Doppler frequency of the current signal within the channel;
evaluate the prediction accuracy of the predicted signal with the delay spread and the Doppler frequency; and
adjust a handoff parameter when the Doppler frequency is greater than a Doppler threshold for communicating through the mobile station.

28. The system as claimed in claim 27 wherein the control unit is configured to:
calculate a candidate shift relative to a candidate station and a base shift relative to a serving station; and
compare the candidate shift and the base shift.

* * * * *